(12) United States Patent
Weerasooriya et al.

(10) Patent No.: US 9,862,877 B2
(45) Date of Patent: Jan. 9, 2018

(54) ALKYL HYDROPHOBE SURFACTANTS

(71) Applicant: Board of Regents, The University of Texas System, Austin, TX (US)

(72) Inventors: Upali P. Weerasooriya, Austin, TX (US); Gary A. Pope, Cedar Park, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 13/866,749

(22) Filed: Apr. 19, 2013

(65) Prior Publication Data

US 2013/0281327 A1  Oct. 24, 2013

Related U.S. Application Data

(60) Provisional application No. 61/635,714, filed on Apr. 19, 2012.

(51) Int. Cl.
*C09K 8/584* (2006.01)

(52) U.S. Cl.
CPC .................................. *C09K 8/584* (2013.01)

(58) Field of Classification Search
None
See application file for complete search history.

(56) References Cited

U.S. PATENT DOCUMENTS

| | | | |
|---|---|---|---|
| 3,811,504 A | 5/1974 | Flournoy et al. | |
| 3,811,505 A | 5/1974 | Flournoy et al. | |
| 3,811,507 A | 5/1974 | Flournoy et al. | |
| 3,890,239 A | 6/1975 | Dycus et al. | |
| 4,463,806 A * | 8/1984 | Hurd | 166/270.1 |
| 6,022,843 A | 2/2000 | Shanks et al. | |
| 6,225,267 B1 | 5/2001 | Eckard et al. | |
| 7,629,299 B2 | 12/2009 | Berger et al. | |
| 2005/0199395 A1 | 9/2005 | Berger et al. | |
| 2006/0185845 A1 | 8/2006 | Shpakoff et al. | |
| 2007/0191633 A1 | 8/2007 | Berger et al. | |
| 2009/0264598 A1† | 10/2009 | Bittner | |
| 2009/0270281 A1* | 10/2009 | Steinbrenner et al. | 507/237 |
| 2010/0048432 A1 | 2/2010 | Costello et al. | |

(Continued)

FOREIGN PATENT DOCUMENTS

| | | |
|---|---|---|
| CN | 101108326 A | 1/2008 |
| WO | 2008-079855 A2 | 7/2008 |

(Continued)

OTHER PUBLICATIONS

International Search Report and Written Opinion dated Jul. 8, 2013 for International Patent Application No. PCT/US2013/037428, 11 pages.

(Continued)

*Primary Examiner* — Alicia Bland
(74) *Attorney, Agent, or Firm* — Meunier Carlin & Curfman LLC

(57) ABSTRACT

Provided herein are inter alia novel compositions and methods having application in the field of enhanced oil recovery. In particular, the short hydrophobe compounds and mixtures thereof presented herein can be used, inter alia, for the recovery of a large range of crude oil compositions from challenging reservoirs.

19 Claims, 13 Drawing Sheets

(56) References Cited

U.S. PATENT DOCUMENTS

| | | | |
|---|---|---|---|
| 2010/0081716 | A1 | 4/2010 | Matsunaga et al. |
| 2010/0292110 | A1* | 11/2010 | Pope et al. .................... 507/226 |
| 2010/0319920 | A1 | 12/2010 | Pope et al. |
| 2011/0046024 | A1 | 2/2011 | Campbell et al. |
| 2011/0048721 | A1 | 3/2011 | Pope et al. |
| 2011/0059872 | A1 | 3/2011 | Weerasooriya et al. |
| 2011/0059873 | A1 | 3/2011 | Weerasooriya et al. |
| 2011/0071057 | A1* | 3/2011 | Weerasooriya ...... C07D 301/00 507/219 |
| 2011/0100402 | A1 | 5/2011 | Soane et al. |
| 2011/0190174 | A1 | 8/2011 | Weerasooriya et al. |
| 2011/0190175 | A1 | 8/2011 | Steinbrenner et al. |
| 2011/0201531 | A1 | 8/2011 | Sharma et al. |
| 2011/0220365 | A1* | 9/2011 | Bittner et al. ................ 166/369 |
| 2011/0259583 | A1 | 10/2011 | Bittner et al. |

FOREIGN PATENT DOCUMENTS

| | | | |
|---|---|---|---|
| WO | 2011-037975 | A2 | 3/2011 |
| WO | 2011037975 | A2 † | 3/2011 |
| WO | 2011-094442 | A1 | 8/2011 |
| WO | 2012-027757 | A1 | 3/2012 |
| WO | 2013/159027 | A1 | 10/2013 |

OTHER PUBLICATIONS

Wang, D.-F. et al., "The relationship between interfacial tension and oil displacement efficiency of a surfactant flooding solution for heavy crude oil", Oilfield Chemistry, 2009, vol. 26, No. 3, pp. 312-315. See abstract and compound 9AS-50.

Zeng, J. et al., "Synthesis and evaluation of homogeneous sodium hexadecyl polyoxy propylene ether sulfates", Journal of Dispersion Science and Technology, 2010, vol. 31, No. 3, pp. 307-313. See compound 4-6, table 1 and fig. 1.

Ali, J. et al., "Foam enhanced oil recovery from sand packs", Chemical Engineering Research and Design, 1985, vol. 63, No. 2, pp. 101-111. See abstract, appendix A and FENOPON C0-433.

Anton et al., "Practical Surfactant Mixing Rules Based on the Attainment of Microemulsion-Oil-Water Three-Phase Behavior Systems", *Adv. Polym. Sci.*, 2008, vol. 218, pp. 83-113.

Third Party Observation submitted on Jan. 22, 2014 for International Patent Application No. PCT/US2013/037428, 2 pages.

Extended European Search Report in International Application No. PCT/US2013037428 dated Jan. 19, 2016.

\* cited by examiner
† cited by third party

ALKYL HYDROPHOBE SURFACTANTS

CROSS-REFERENCE TO RELATED APPLICATIONS

This application claims the benefit of U.S. Provisional Application No. 61/635,714 filed Apr. 19, 2012, which is hereby incorporated in its entirety and for all purposes.

BACKGROUND OF THE INVENTION

Enhanced Oil Recovery (abbreviated EOR) refers to techniques for increasing the amount of unrefined petroleum, or crude oil that may be extracted from an oil reservoir (e.g. an oil field). Using EOR, 40-60% of the reservoir's original oil can typically be extracted compared with only 20-40% using primary and secondary recovery (e.g. by water injection or natural gas injection). Enhanced oil recovery may also be referred to as improved oil recovery or tertiary oil recovery (as opposed to primary and secondary oil recovery).

Enhanced oil recovery may be achieved by a variety of methods including miscible gas injection (which includes carbon dioxide flooding), chemical injection (which includes polymer flooding, alkaline flooding and surfactant flooding), microbial injection, or thermal recovery (which includes cyclic steam, steam flooding, and fire flooding). The injection of various chemicals, usually as dilute aqueous solutions, has been used to improve oil recovery. Injection of alkaline or caustic solutions into reservoirs with oil that has organic acids naturally occurring in the oil (also referred to herein as "unrefined petroleum acids") will result in the production of soap that may lower the interfacial tension enough to increase production. Injection of a dilute solution of a water soluble polymer to increase the viscosity of the injected water can increase the amount of oil recovered from geological formations. Aqueous solutions of surfactants such as petroleum sulfonates may be injected to lower the interfacial tension or capillary pressure that impedes oil droplets from moving through a reservoir. Special formulations of oil, water and surfactant microemulsions, have also proven useful. Application of these methods is usually limited by the cost of the chemicals and their adsorption and loss onto the rock of the oil containing formation. Further, different crude oils require different surfactant compositions in order to provide for efficient oil production. For instance, light crude oils are very compatible with short hydrophobe surfactants. However, there is a need in the art for light oil EOR surfactants with better water solubility while maintaining the high surface activities. Provided herein are compositions and methods using the same that address these and other needs in the art.

BRIEF SUMMARY OF THE INVENTION

In one aspect, a compound having the formula

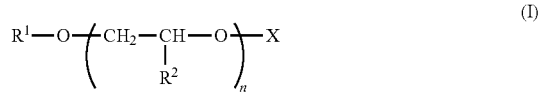

(I)

is provided. In formula (I) $R^1$ is $R^4$-substituted or unsubstituted $C_8$-$C_{20}$ alkyl, $R^3$-substituted or unsubstituted aryl or $R^3$-substituted or unsubstituted cycloalkyl. $R^2$ is independently hydrogen or methyl. $R^3$ is independently $R^4$-substituted or unsubstituted $C_1$-$C_{15}$ alkyl, $R^4$-substituted or unsubstituted aryl or $R^4$-substituted or unsubstituted cycloalkyl. $R^4$ is independently unsubstituted aryl or unsubstituted cycloalkyl. n is an integer from 25 to 115. X is —$SO_3^-M^+$, —$CH_2C(O)O^-M^+$, —$SO_3H$ or —$CH_2C(O)OH$, and $M^+$ is a monovalent, divalent or trivalent cation.

In another aspect, an aqueous composition including a co-surfactant and a compound as described herein (e.g. a compound of formula (I) or (II)) is provided.

In another aspect, an emulsion composition including an unrefined petroleum phase and a compound as described herein (e.g. a compound of formula (I) or (II)) is provided.

In another aspect, a method of displacing a hydrocarbon material in contact with a solid material is provided. The method includes contacting a hydrocarbon material with a compound as described herein (e.g. a compound of formula (I) or (II)), wherein the hydrocarbon material is in contact with a solid material. The hydrocarbon material is allowed to separate from the solid material thereby displacing the hydrocarbon material in contact with the solid material.

In another aspect, a method of converting an unrefined petroleum acid into a surfactant is provided. The method includes contacting a petroleum material with an aqueous composition thereby forming an emulsion in contact with the petroleum material, wherein the aqueous composition includes the compound described herein (e.g. a compound of formula (I) or (II)) and a co-surfactant. An unrefined petroleum acid within the unrefined petroleum material is allowed to enter into the emulsion, thereby converting the unrefined petroleum acid into a surfactant.

In another aspect, a method of making a compound as described herein (e.g. a compound of formula (I) or (II)) is provided. The method includes contacting an alcohol with a propylene oxide thereby forming a first alkoxylated hydrophobe. The first alkoxylated hydrophobe is contacted with an ethylene oxide thereby forming a second alkoxylated hydrophobe. The second alkoxylated hydrophobe is contacted with one or more anionic functional groups thereby forming a compound as described herein.

DETAILED DESCRIPTION OF THE INVENTION

I. Definitions

Figure 1:
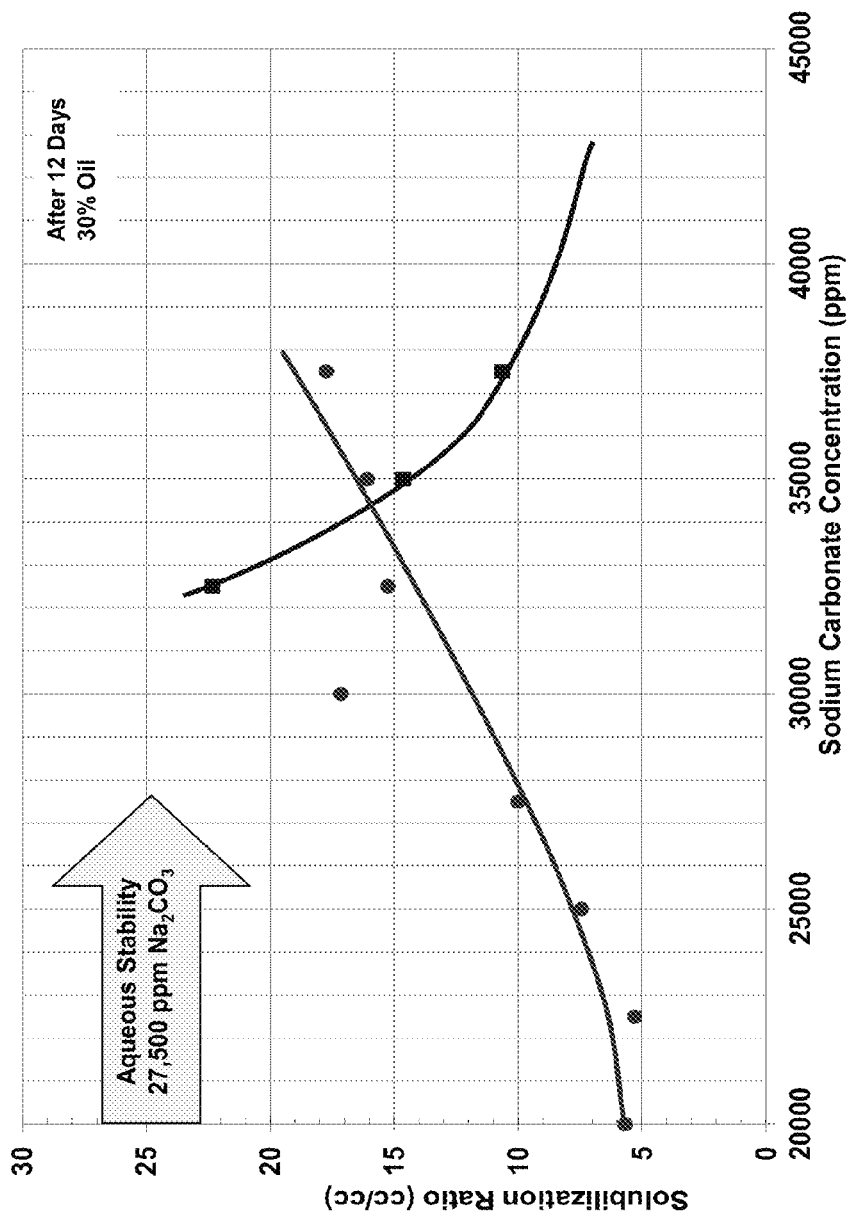
FIG. 1. Solubilization ratios for light crude oil using the surfactant formulation TDA-13PO Sulfate PB with Oil #11 (30%) at 44° C. after 12 days. The surfactant composition includes 0.5% TDA-13PO Sulfate, 0.5% C20-24 IOS, and 1% TEGBE. The black arrow in the histogram pointing from left to right indicates the aqueous stability at 27,500 ppm (TDS) of $Na_2CO_3$.

The abbreviations used herein have their conventional meaning within the chemical and biological arts.

Where substituent groups are specified by their conventional chemical formulae, written from left to right, they equally encompass the chemically identical substituents that would result from writing the structure from right to left, e.g., —$CH_2O$— is equivalent to —$OCH_2$—.

The term "alkyl," by itself or as part of another substituent, means, unless otherwise stated, a straight (i.e. unbranched) or branched chain which may be fully saturated, mono- or polyunsaturated (e.g. oleic, linoleic, and linolenic) and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl". An alkoxy is an alkyl attached to the remainder of the molecule via an oxygen linker (—O—).

The term "alkylene" by itself or as part of another substituent means a divalent radical derived from an alkyl, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S, and wherein the nitrogen and sulfur atoms may optionally be oxidized. and the nitrogen heteroatom may optionally be quaternized. The heteroatom(s) O, N, P and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—$N(CH_3)$—$CH_3$, —$CH_2$—S—$CH_2$—$CH_3$, —$CH_2$—$CH_2$, —S(O)—$CH_3$, —$CH_2$—$CH_2$—S$(O)_2$—$CH_3$, —CH=CH—O—$CH_3$, —$Si(CH_3)_3$, —$CH_2$—CH=N—$OCH_3$, —CH=CH—$N(CH_3)$—$CH_3$, O—$CH_3$, —O—$CH_2$—$CH_3$, and —CN. Up to two heteroatoms may be consecutive, such as, for example, —$CH_2$—NH—$OCH_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent means a divalent radical derived from a cycloalkyl and heterocycloalkyl, respectively.

The term "aryl" means, unless otherwise stated, a polyunsaturated, aromatic, hydrocarbon substituent which can be a single ring or multiple rings (preferably from 1 to 3 rings) which are fused together (i.e. a fused ring aryl) or linked covalently. A fused ring aryl refers to multiple rings fused together wherein at least one of the fused rings is an aryl ring. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. Thus, the term "heteroaryl" includes fused ring heteroaryl groups (i.e. multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent means a divalent radical derived from an aryl and heteroaryl, respectively.

The term "oxo" as used herein means an oxygen that is double bonded to a carbon atom.

Where a substituent of a compound provided herein is "R-substituted" (e.g. R$^4$-substituted), it is meant that the substituent is substituted with one or more of the named R groups (e.g. R$^4$) as appropriate. In some embodiments, the substituent is substituted with only one of the named R groups.

Each R-group as provided in the formulae provided herein can appear more than once. Where a R-group appears more than once each R group can be optionally different.

The term "contacting" as used herein, refers to materials or compounds being sufficiently close in proximity to react or interact. For example, in methods of contacting a hydrocarbon material bearing formation and/or a well bore, the term "contacting" includes placing an aqueous composition (e.g. chemical, surfactant or polymer) within a hydrocarbon material bearing formation using any suitable manner known in the art (e.g., pumping, injecting, pouring, releasing, displacing, spotting or circulating the chemical into a well, well bore or hydrocarbon bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e. organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e. API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil as referred to herein is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbon material or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$ to $C_{20}$ alkyl chains, including napthenic acid mixtures. The recovery of such "reactive" oils may be performed using alkali (e.g. NaOH or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "bonded" refers to having at least one of covalent bonding, hydrogen bonding, ionic bonding, Van Der Waals interactions, pi interactions, London forces or electrostatic interactions.

The term "productivity" as applied to a petroleum or oil well refers to the capacity of a well to produce hydrocarbons (e.g. unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "oil solubilization ratio" is defined as the volume of oil solubilized divided by the volume of surfactant in microemulsion. All the surfactant is presumed to be in the microemulsion phase. The oil solubilization ratio is applied for Winsor type I and type III behavior. The volume of oil solubilized is found by reading the change between initial aqueous level and excess oil (top) interface level. The oil solubilization ratio is calculated as follows:

$$\sigma_o = \frac{V_o}{V_s},$$

wherein
$\sigma_o$=oil solubilization ratio;
$V_o$=volume of oil solubilized;
$V_s$=volume of surfactant.

The term "water solubilization ratio" is defined as the volume of water solubilized divided by the volume of surfactant in microemulsion. All the surfactant is presumed to be in the microemulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s},$$

wherein
$\sigma_w$=water solubilization ratio;
$V_w$=volume of water solubilized.

The optimum solubilization ratio occurs where the oil and water solubilization ratios are equal. The coarse nature of phase behavior screening often does not include a data point at optimum, so the solubilization ratio curves are drawn for the oil and water solubilization ratio data and the intersection of these two curves is defined as the optimum. The following is true for the optimum solubilization ratio:

$$\sigma_O = \sigma_W = \sigma^*;$$

$\sigma^*$=optimum solubilization ratio.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g. precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in an aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "aqueous solution or aqueous formulation" refers to a solution in which the solvent is water. The term "emulsion, emulsion solution or emulsion formulation" refers to a mixture of two or more liquids which are normally immiscible. A non-limiting example for an emulsion is a mixture of oil and water.

A "co-solvent" refers to a compound having the ability to increase the solubility of a solute (e.g. a surfactant as disclosed herein) in the presence of an unrefined petroleum acid. In some embodiments, the co-solvents provided herein have a hydrophobic portion (alkyl or aryl chain), a hydrophilic portion (e.g. an alcohol) and optionally an alkoxy portion. Co-solvents as provided herein include alcohols (e.g. $C_1$-$C_6$ alcohols, $C_1$-$C_6$ diols), alkoxy alcohols (e.g. $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group A "microemulsion" as referred to herein is a thermodynamically stable mixture of oil, water, and a stabilizing agents such as a surfactant or a co-solvent that may also include additional components such as alkali agents, polymers (e.g. water-soluble polymers) and a salt. In contrast, a "macroemulsion" as referred to herein is a thermodynamically unstable mixture of oil and water that may also include additional components. An "emulsion" as referred to herein may be a microemulsion or a macroemulsion.

II. Compositions

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not limit the scope of the invention.

Provided herein, inter alia, are short hydrophobe compounds and methods of using the same for a variety of applications including enhanced oil recovery. The compounds provided herein may be used with broad oil concentrations, at a wide range of salinities, at high reservoir temperatures and over a broad pH range. The compounds described herein may significantly improve the effectiveness of co-surfactant sulfonate compounds such as ABS or IOS to a surprising degree. Where sulfonate compounds are combined with the compounds provided herein, the combination may be more stable and effective when compared to the stability and effectiveness of the sulfonate compounds in the absence of the compounds provided herein (e.g. a compound of formula (I) or (II)). Further, the compounds provided herein (e.g. a compound of formula (I) or (II)) possess improved water solubility while surprisingly maintaining high surface activities (e.g. surfactant activity).

In a first aspect, the present invention provides a compound having the formula

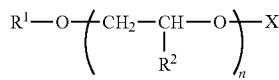 (I)

is provided. In formula (I) $R^1$ is $R^4$-substituted or unsubstituted $C_8$-$C_{20}$ alkyl, $R^3$-substituted or unsubstituted aryl or $R^3$-substituted or unsubstituted cycloalkyl. $R^2$ is independently hydrogen or methyl. $R^3$ is independently $R^4$-substituted or unsubstituted $C_1$-$C_{15}$ alkyl, $R^4$-substituted or unsubstituted aryl or $R^4$-substituted or unsubstituted cycloalkyl. $R^4$ is independently unsubstituted aryl or unsubstituted cycloalkyl. n is an integer from 25 to 115. X is —$SO_3^-M^+$, —$CH_2C(O)O^-M^+$, —$SO_3H$ or —$CH_2C(O)OH$, and $M^+$ is a monovalent, divalent or trivalent cation.

In some embodiments, the symbol n is an integer from 25 to 115. In other embodiments, the symbol n is an integer from 30 to 115. In other embodiments, the symbol n is an integer from 35 to 115. In other embodiments, the symbol n is an integer from 40 to 115. In other embodiments, the symbol n is an integer from 45 to 115. In other embodiments, the symbol n is an integer from 50 to 115. In other embodiments, the symbol n is an integer from 55 to 115. In other embodiments, the symbol n is an integer from 60 to 115. In other embodiments, the symbol n is an integer from 65 to 115. In other embodiments, the symbol n is an integer from 70 to 115. In other embodiments, the symbol n is an integer from 75 to 115. In other embodiments, the symbol n is an integer from 80 to 115. In other embodiments, the symbol n is an integer from 30 to 80. In other embodiments, the symbol n is an integer from 35 to 80. In other embodiments, the symbol n is an integer from 40 to 80. In other embodiments, the symbol n is an integer from 45 to 80. In other embodiments, the symbol n is an integer from 50 to 80. In other embodiments, the symbol n is an integer from 55 to 80. In other embodiments, the symbol n is an integer from 60 to 80. In other embodiments, the symbol n is an integer from 65 to 80. In other embodiments, the symbol n is an integer from 70 to 80. In other embodiments, the symbol n is an integer from 75 to 80. In other embodiments, the symbol n is an integer from 30 to 60. In other embodiments, the symbol n is an integer from 35 to 60. In other embodiments, the symbol n is an integer from 40 to 60. In other embodiments, the symbol n is an integer from 45 to 60. In other embodiments, the symbol n is an integer from 50 to 60. In other embodiments, the symbol n is an integer from 55 to 60. In other embodiments, n is 25. In other embodiments, n is 50. In some embodiments, n is 55. In some embodiments, n is 75. In some related embodiments, $R^1$ is $R^4$-substituted or unsubstituted $C_8$-$C_{20}$ alkyl. In some other related embodiments, $R^1$ is $R^4$-substituted or unsubstituted $C_{12}$-$C_{20}$ alkyl. In some other related embodiments, $R^1$ is $R^4$-substituted or unsubstituted $C_{13}$-$C_{20}$ alkyl. In some other related embodiments, $R^1$ is $R^4$-substituted or unsubstituted $C_{13}$ alkyl. In some other related embodiments, $R^1$ is unsubstituted $C_{13}$ alkyl. In other related embodiments, $R^1$ is a unsubstituted tridecyl (i.e. a $C_{13}H_{27}$-alkyl radical derived from tridecylalcohol). In yet some other related embodiments, $R^1$ is $R^4$-substituted or unsubstituted $C_{15}$-$C_{20}$ alkyl. In some other related embodiments, $R^1$ is $R^4$-substituted or unsubstituted $C_{18}$ alkyl. In some other related embodiments, $R^1$ is unsubstituted $C_{18}$ alkyl. In other related embodiments, $R^1$ is an unsubstituted oleyl (i.e. a $C_{17}H_{33}CH_2$-radical derived from oleyl alcohol).

$R^1$ may be $R^4$-substituted or unsubstituted alkyl. In some embodiments, $R^1$ is $R^4$-substituted or unsubstituted $C_8$-$C_{20}$ alkyl. In some embodiments, $R^1$ is $R^4$-substituted or unsubstituted $C_{10}$-$C_{20}$ alkyl. In some embodiments, $R^1$ is $R^4$-substituted or unsubstituted $C_{12}$-$C_{20}$ alkyl. In some embodiments, $R^1$ is $R^4$-substituted or unsubstituted $C_{13}$-$C_{20}$ alkyl. In some embodiments, $R^1$ is $R^4$-substituted or unsubstituted $C_{14}$-$C_{20}$ alkyl. In some embodiments, $R^1$ is $R^4$-substituted or unsubstituted $C_{16}$-$C_{20}$ alkyl. In some embodiments, $R^1$ is $R^4$-substituted or unsubstituted $C_8$-$C_{15}$ alkyl. In some embodiments, $R^1$ is $R^4$-substituted or unsubstituted $C_{10}$-$C_{15}$ alkyl. In some embodiments, $R^1$ is $R^4$-substituted or unsubstituted $C_{12}$-$C_{15}$ alkyl. In some embodiments, $R^1$ is $R^4$-substituted or unsubstituted $C_{13}$-$C_{15}$ alkyl. In some related embodiments, the alkyl is a saturated alkyl. In some other related embodiments, $R^1$ is $R^4$-substituted or unsubstituted $C_{13}$ alkyl. In some other related embodiments, $R^1$ is unsubstituted $C_{13}$ alkyl. In other related embodiments, $R^1$ is a tridecyl (i.e. a $C_{13}H_{27}$-alkyl radical derived from tridecylalcohol). In some other related embodiments, $R^1$ is $R^4$-substituted or unsubstituted $C_{18}$ alkyl. In some other related embodiments, $R^1$ is unsubstituted $C_{18}$ alkyl. In other related embodiments, $R^1$ is an oleyl (i.e. a $C_{17}H_{33}CH_2$-radical derived from oleyl alcohol). In other related embodiments, n is as defined in an embodiment above (e.g. n is at least 40, or at least 50, e.g. 55 to 85).

$R^1$ may be linear or branched unsubstituted $C_8$-$C_{20}$ alkyl. In some embodiments, $R^1$ is branched unsubstituted $C_8$-$C_{20}$ alkyl. In other embodiments, $R^1$ is linear unsubstituted $C_8$-$C_{20}$ alkyl. In some embodiments, $R^1$ is branched unsubstituted $C_8$-$C_{18}$ alkyl. In other embodiments, $R^1$ is branched unsubstituted $C_8$-$C_{18}$ alkyl. In other embodiments, $R^1$ is linear unsubstituted $C_8$-$C_{18}$ alkyl. In some other related embodiments, $R^1$ is branched unsubstituted $C_{18}$ alkyl. In other related embodiments, $R^1$ is an oleyl (i.e. a $C_{17}H_{33}CH_2$-radical derived from oleyl alcohol). In some embodiments, $R^1$ is linear or branched unsubstituted $C_8$-$C_{16}$ alkyl. In some embodiments, $R^1$ is branched unsubstituted $C_8$-$C_{16}$ alkyl. In other embodiments, $R^1$ is linear unsubstituted $C_8$-$C_{16}$ alkyl. In some embodiments, $R^1$ is linear or branched unsubstituted $C_8$-$C_{14}$ alkyl. In some embodiments, $R^1$ is branched unsubstituted $C_8$-$C_{14}$ alkyl. In other embodiments, $R^1$ is linear unsubstituted $C_8$-$C_{14}$ alkyl. In some other related embodiments, $R^1$ is branched unsubstituted $C_{13}$ alkyl. In other related embodiments, $R^1$ is a tridecyl (i.e. a $C_{13}H_{27}$-alkyl radical derived from tridecylalcohol). In some embodiments, $R^1$ is linear or branched unsubstituted $C_8$-$C_{12}$ alkyl. In some embodiments, $R^1$ is branched unsubstituted $C_8$-$C_{12}$ alkyl. In other embodiments, $R^1$ is linear unsubstituted $C_8$-$C_{12}$ alkyl. In other related embodiments, n is as defined in an embodiment above (e.g. n is at least 40, or at least 50, e.g. 55 to 85).

In some embodiments, where $R^1$ is a linear or branched unsubstituted alkyl (e.g. branched unsubstituted $C_{10}$-$C_{20}$ alkyl), the alkyl is a saturated alkyl (e.g. a linear or branched unsubstituted saturated alkyl or branched unsubstituted $C_{10}$-$C_{20}$ saturated alkyl). A "saturated alkyl," as used herein, refers to an alkyl consisting only of hydrogen and carbon atoms that are bonded exclusively by single bonds. Thus, in some embodiments, $R^1$ may be linear or branched unsubstituted saturated alkyl. In some embodiments, $R^1$ is branched unsubstituted $C_{10}$-$C_{20}$ saturated alkyl. In other embodiments, $R^1$ is linear unsubstituted $C_{10}$-$C_{20}$ saturated alkyl. In some embodiments, $R^1$ is branched unsubstituted $C_{12}$-$C_{20}$ saturated alkyl. In other embodiments, $R^1$ is linear unsubstituted $C_{12}$-$C_{20}$ saturated alkyl. In some embodiments, $R^1$ is branched unsubstituted $C_{12}$-$C_{16}$ saturated alkyl. In other embodiments, $R^1$ is linear unsubstituted $C_{12}$-$C_{16}$ saturated alkyl. In some further embodiment, $R^1$ is linear unsubstituted $C_{13}$ saturated alkyl.

In some embodiments, where $R^1$ is a linear or branched unsubstituted alkyl (e.g. branched unsubstituted $C_{10}$-$C_{20}$ alkyl), the alkyl is an unsaturated alkyl (e.g. a linear or branched unsubstituted unsaturated alkyl or branched unsubstituted $C_{10}$-$C_{20}$ unsaturated alkyl). An "unsaturated alkyl," as used herein, refers to an alkyl having one or more double bonds or triple bonds. An unsaturated alkyl as provided herein can be mono- or polyunsaturated and can include di- and multivalent radicals. Thus, in some embodiments, $R^1$ may be linear or branched unsubstituted unsaturated alkyl. In some embodiments, $R^1$ is branched unsubstituted $C_{10}$-$C_{20}$ unsaturated alkyl. In other embodiments, $R^1$ is linear unsubstituted $C_{10}$-$C_{20}$ unsaturated alkyl. In some embodiments, $R^1$ is branched unsubstituted $C_{12}$-$C_{20}$ unsaturated alkyl. In other embodiments, $R^1$ is linear unsubstituted $C_{12}$-$C_{20}$ unsaturated alkyl. In some embodiments, $R^1$ is branched unsubstituted $C_{12}$-$C_{18}$ unsaturated alkyl. In other embodiments, $R^1$ is linear unsubstituted $C_{12}$-$C_{18}$ unsaturated alkyl. In some embodiments, $R^1$ is linear unsubstituted $C_{18}$ unsaturated alkyl. In other embodiments, $R^1$ is branched unsubstituted $C_{18}$ unsaturated alkyl. In one embodiment, $R^1$ is linear unsubstituted $C_{18}$ mono-unsaturated alkyl. In another embodiment, $R^1$ is linear unsubstituted $C_{18}$ poly-unsaturated alkyl. In one embodiment, $R^1$ is branched unsubstituted $C_{18}$ mono-unsaturated alkyl. In another embodiment, $R^1$ is branched unsubstituted $C_{18}$ poly-unsaturated alkyl.

In some embodiments, $R^2$ is independently hydrogen or methyl.

As provided herein $R^1$ may be $R^4$-substituted or unsubstituted $C_8$-$C_{20}$ (e.g., $C_{12}$-$C_{18}$) alkyl, $R^3$-substituted or unsubstituted $C_5$-$C_{10}$ (e.g., $C_5$-$C_6$) aryl or $R^3$-substituted or unsubstituted $C_3$-$C_8$ (e.g., $C_5$-$C_7$) cykloalkyl. $R^3$ may be independently $R^4$-substituted or unsubstituted $C_1$-$C_{15}$ (e.g., $C_8$-$C_{12}$) alkyl, $R^4$-substituted or unsubstituted $C_5$-$C_{10}$ (e.g., $C_5$-$C_6$) aryl or $R^4$-substituted or unsubstituted $C_3$-$C_8$ (e.g., $C_5$-$C_7$) cykloalkyl. Thus in some embodiments, $R^3$ is $R^4$-substituted or unsubstituted $C_1$-$C_{15}$ alkyl, $R^4$-substituted or unsubstituted $C_5$-$C_{10}$ aryl or $R^4$-substituted or unsubstituted $C_3$-$C_8$ cycloalkyl. $R^4$ may be independently unsubstituted $C_5$-$C_{10}$ (e.g., $C_5$-$C_6$) aryl or unsubstituted $C_3$-$C_8$ (e.g., $C_5$-$C_7$) cykloalkyl. Thus, in some embodiments, $R^4$ is independently unsubstituted $C_5$-$C_{10}$ aryl or unsubstituted $C_3$-$C_8$ cykloalkyl.

$M^+$ may be a monovalent, divalent or trivalent cation. In some embodiments, $M^+$ is a monovalent, divalent or trivalent metal cation. In some embodiments, $M^+$ is a monovalent or divalent cation (e.g. metal cation). In some embodiments, $M^+$ is a monovalent cation (e.g. metal cation). In some embodiments, $M^+$ is a divalent cation (e.g. metal cation). In some embodiments, $M^+$ is $Na^+$, $K^+$, $NH_4^+$, $Ca^{+2}$, $Mg^{+2}$ or $Ba^{+2}$. A person having ordinary skill in the art will immediately recognize that $M^+$ may be a divalent cation where X is a monovalent anion (e.g. where $M^+$ is coordinated with more than one compound provided herein or with an additional anion in the surrounding liquid environment).

In some embodiments, where multiple $R^2$ substituents are present and at least two $R^2$ substituents are different, $R^2$ substituents with the fewest number of carbons are present to the side of the compound of formula (I) bound to the X substituent. In this embodiment, the compound of formula (I) will be increasingly hydrophilic in progressing from the $R^2$ substituent to the side of the compound of formula (I) bound to the X substituent. The term "side of the compound of formula (I) bound to the X substituent" refers to the side of the compound indicated by asterisks in the below structure:

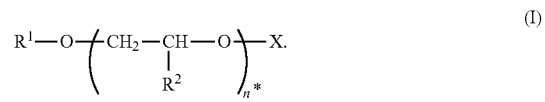

(I)

In some embodiments of the compound of formula (I), or embodiments thereof provided herein, where $R^1$ is unsubstituted $C_{10}$-$C_{15}$ alkyl and $R^2$ is independently hydrogen or methyl, the symbol n is an integer from 25 to 115. In other embodiments, where $R^1$ is unsubstituted $C_{10}$-$C_{15}$ alkyl and $R^2$ is independently hydrogen or methyl, the symbol n is an integer from 20 to 75. In other embodiments, where $R^1$ is unsubstituted $C_{10}$-$C_{15}$ alkyl and $R^2$ is independently hydrogen or methyl, the symbol n is an integer from 20 to 65. In other embodiments, where $R^1$ is unsubstituted $C_{10}$-$C_{15}$ alkyl and $R^2$ is independently hydrogen or methyl, the symbol n is an integer from 20 to 55. In other embodiments, where $R^1$ is unsubstituted $C_{10}$-$C_{15}$ alkyl and $R^2$ is independently hydrogen or methyl, the symbol n is an integer from 35 to 75. In other embodiments, where $R^1$ is unsubstituted $C_{10}$-$C_{15}$ alkyl and $R^2$ is independently hydrogen or methyl, the symbol n is an integer from 35 to 65. In other embodiments, where $R^1$ is unsubstituted $C_{10}$-$C_{15}$ alkyl and $R^2$ is independently hydrogen or methyl, the symbol n is an integer from 35 to 55. In other embodiments, where $R^1$ is unsubstituted $C_{10}$-$C_{15}$ alkyl and $R^2$ is independently hydrogen or methyl, the symbol n is an integer from 40 to 75. In other embodiments, where $R^1$ is unsubstituted $C_{10}$-$C_{15}$ alkyl and $R^2$ is independently hydrogen or methyl, the symbol n is an integer from 40 to 65. In other embodiments, where $R^1$ is unsubstituted $C_{10}$-$C_{15}$ alkyl and $R^2$ is independently hydrogen or methyl, the symbol n is an integer from 40 to 55. In some further embodiments, where $R^1$ is unsubstituted $C_{10}$-$C_{15}$ alkyl and $R^2$ is independently hydrogen or methyl, the symbol n is 55.

In some embodiments of the compound of formula (I), or embodiments thereof provided herein, where $R^1$ is unsubstituted $C_{12}$-$C_{20}$ unsaturated alkyl and $R^2$ is independently hydrogen or methyl, the symbol n is an integer from 25 to 115. In other embodiments, where $R^1$ is unsubstituted $C_{12}$-$C_{20}$ unsaturated alkyl and $R^2$ is independently hydrogen or methyl, the symbol n is an integer from 40 to 115. In other embodiments, where $R^1$ is unsubstituted $C_{12}$-$C_{20}$ unsaturated alkyl and $R^2$ is independently hydrogen or methyl, the symbol n is an integer from 50 to 115. In other embodiments, where $R^1$ is unsubstituted $C_{12}$-$C_{20}$ unsaturated alkyl and $R^2$ is independently hydrogen or methyl, the symbol n is an integer from 60 to 115. In other embodiments, where $R^1$ is unsubstituted $C_{12}$-$C_{20}$ unsaturated alkyl and $R^2$ is independently hydrogen or methyl, the symbol n is an integer from 70 to 115. In other embodiments, where $R^1$ is unsubstituted $C_{12}$-$C_{20}$ unsaturated alkyl and $R^2$ is independently hydrogen or methyl, the symbol n is an integer from 75 to 115. In some further embodiments, where $R^1$ is unsubstituted $C_{12}$-$C_{20}$ unsaturated alkyl and $R^2$ is independently hydrogen or methyl, the symbol n is 75. In other embodiments, where $R^1$ is unsubstituted $C_{12}$-$C_{20}$ unsaturated alkyl and $R^2$ is independently hydrogen or methyl, the symbol n is an integer from 80 to 115. In other embodiments, where $R^1$ is unsubstituted $C_{12}$-$C_{20}$ unsaturated alkyl and $R^2$ is independently hydrogen or methyl, the symbol n is an integer from 85 to 115. In other embodiments, where $R^1$ is unsubstituted $C_{12}$-$C_{20}$ unsaturated alkyl and $R^2$ is independently hydrogen or methyl, the symbol n is an integer from 90 to 115.

In some embodiments, the compound has the formula

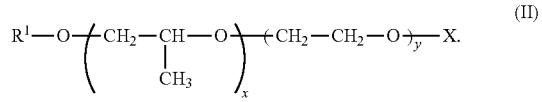

(II)

In formula (II) $R^1$ and X are defined as above (e.g. in formula (I)). y is an integer from 5 to 40, and x is an integer from 35 to 50. In some further embodiments, y is 10 and x is 45. In some other further embodiments, $R^1$ is $C_{13}$ alkyl. In some further embodiments, y is 30 and x is 45. In some other further embodiments, $R^1$ is unsubstituted $C_{18}$ unsaturated alkyl. In some embodiments, $R^1$ is linear unsubstituted $C_{18}$ unsaturated alkyl. In other embodiments, $R^1$ is branched unsubstituted $C_{18}$ unsaturated alkyl. In one embodiment, $R^1$ is linear unsubstituted $C_{18}$ mono-unsaturated alkyl. In another embodiment, $R^1$ is linear unsubstituted $C_{18}$ poly-unsaturated alkyl. In one embodiment, $R^1$ is branched unsubstituted $C_{18}$ mono-unsaturated alkyl. In another embodiment, $R^1$ is branched unsubstituted $C_{18}$ poly-unsaturated alkyl.

In some embodiment of the compound of formula (I) or (II), or embodiments thereof disclosed herein, where $R^1$ is unsubstituted $C_{13}$ alkyl, n is 55, X is $-SO_3^-M^l$, and $M^l$ is a divalent cation (e.g. $Na^{2+}$). In a further embodiment, x is 45 and y Is 10. In another embodiment of the compound of formula (I) or (II), or embodiments thereof disclosed herein, where $R^1$ is unsubstituted $C_{18}$ unsaturated alkyl, n is 75, X is $-CH_2C(O)O^-M^+$, and $M^+$ is a monovalent cation (e.g. $Na^+$). In a further embodiment, x is 45 and y is 30.

In another aspect, an aqueous composition including a co-surfactant and a compound as described herein (e.g. a compound of formula (I) or (II)) is provided. A co-surfactant, as used herein, is a compound within the aqueous composition that functions as a surface active agent when the aqueous composition is in contact with a crude oil (e.g. an unrefined petroleum). The co-surfactant, along with the compound of formula (I) or (II), may act to lower the interfacial tension and/or surface tension of the unrefined petroleum. In some embodiments, the co-surfactant and the compound of formula (I) or (II) are present in synergistic surface active amounts. A "synergistic surface active amount," as used herein, means that a compound of formula (I) or (II) and the co-surfactant are present in amounts in which the oil surface activity (interfacial tension lowering effect and/or surface tension lowering effect on crude oil when the aqueous composition is added to the crude oil) of the compound and co-surfactant combined is greater than the additive oil surface activity of the co-surfactant individually and the compound individually. In some cases, the oil surface activity of the compound and co-surfactant combination is 10%, 20%, 30%, 40%, 50%, 60%, 70%, 80%, 90% or 100% more than the additive oil surface activity of the co-surfactant individually and the compound individually. In some embodiments, the oil surface activity of the compound and co-surfactant combination is 2, 3, 4, 5, 6, 7, 8, 9 or 10 times more than the additive oil surface activity of the co-surfactant individually and the compound individually.

In another embodiment, the compound and co-surfactant are present in a surfactant stabilizing amount. A "surfactant stabilizing amount" means that the compound and the co-surfactant are present in an amount in which the co-surfactant degrades at a slower rate in the presence of the compound than in the absence of the compound, and/or the compound degrades at a slower rate in the presence of the co-surfactant than in the absence of the co-surfactant. The rate of degradation may be 10%, 20%, 30%, 40%, 50%, 60%, 70%, 80%, 90% or 100% slower. In some embodiments, the rate of degradation is 2, 3, 4, 5, 6, 7, 8, 9 or 10 times slower.

In another embodiment, the compound and co-surfactant are present in a synergistic solubilizing amount. A "synergistic solubilizing amount" means that the compound and the co-surfactant are present in an amount in which the compound is more soluble in the presence of the co-surfactant than in the absence of the surfactant, and/or the co-surfactant is more soluble in the presence of the compound than in the absence of the compound. The solubilization may be 10%, 20%, 30%, 40%, 50%, 60%, 70%, 80%, 90% or 100% higher. In some embodiment, the solubilization is 2, 3, 4, 5, 6, 7, 8, 9 or 10 times higher. In some embodiments, the compound is present in an amount sufficient to increase the solubility of the co-surfactant in the aqueous composition relative to the absence of the compound. In other words, in the presence of a sufficient amount of the compound, the solubility of the co-surfactant in the aqueous composition is higher than in the absence of the compound. In other embodiments, the co-surfactant is present in an amount sufficient to increase the solubility of the compound in the aqueous composition relative to the absence of the co-surfactant. Thus, in the presence of a sufficient amount of the co-surfactant the solubility of the compound in the aqueous solution is higher than in the absence of the co-surfactant.

In some embodiments, a single type of co-surfactant is in the aqueous composition. In other embodiments, a plurality of co-surfactant types is in the aqueous composition. Where the emulsion further includes a co-surfactant, the emulsion may include a co-surfactant or a co-surfactant blend (e.g. a plurality of co-surfactant types). The co-surfactant provided herein may be any appropriate co-surfactant useful in the field of enhanced oil recovery. In some embodiments, the co-surfactant is a single co-surfactant type in the aqueous composition or emulsion composition. In other embodiments, the co-surfactant is a co-surfactant blend. A "co-surfactant blend" as provided herein is a mixture of a plurality of co-surfactant types. In some embodiments, the co-surfactant blend includes a first co-surfactant type, a second co-surfactant type or a third co-surfactant type. The first, second and third co-surfactant type may be independently different (e.g. anionic or cationic co-surfactants; or two anionic co-surfactants having a different hydrocarbon chain length but are otherwise the same). Therefore, a person having ordinary skill in the art will immediately recognize that the terms "co-surfactant" and "co-surfactant type(s)" have the same meaning and can be used interchangeably. In some embodiments, the co-surfactant is an anionic surfactant, a non-ionic surfactant, a zwitterionic surfactant or a cationic surfactant. In some embodiments, the co-surfactant is an anionic surfactant, a non-ionic surfactant or a cationic surfactant. In other embodiments, the co-surfactant is an zwitterionic co-surfactant. "Zwitterionic" or "zwitterion" as used herein refers to a neutral molecule with a positive (or cationic) and a negative (or anionic) electrical charge at different locations within the same molecule. Examples for zwitterionics are without limitation betains and sultains.

The co-surfactant as provided herein may be a combination of one or more anionic, non-ionic, cationic or zwitterionic co-surfactants. In some embodiments, the co-surfactant is an internal olefin sulfonate (IOS), an alfa olefin sulfonate (AOS), an alkyl aryl sulfonate (ARS), an alkane sulfonate, a petroleum sulfonate, an alkyl diphenyl oxide (di)sulfonate, an alcohol sulfate, an alkoxy sulfate, an alkoxy sulfonate, an alcohol phosphate, an alkoxy phosphate, a sulfosuccinate ester, an alcohol ethoxylate, an alkyl phenol ethoxylate, a quaternary ammonium salt, a betaine or sultaine. The co-surfactant as provided herein, may also be a soap.

Without limitation, the co-surfactant may be a combination of two or more of the following compounds: an internal olefin sulfonate (IOS), an alfa olefin sulfonate (AOS), an alkyl aryl sulfonate (ARS) (e.g. an alkyl benzene sulfonate (ABS)), an alkane sulfonate, a petroleum sulfonate, an alkyl diphenyl oxide (di)sulfonate, an alcohol sulfate, an alkoxy sulfate (e.g. an alkyl alkoxy sulfate) an alkoxy sulfonate, an alcohol phosphate, an alkoxy phosphate, a sulfosuccinate ester, an alcohol ethoxylate, an alkyl phenol ethoxylate, a quaternary ammonium salt, a betaine, a sultaine and a soap (or its carboxylic acid). A person having ordinary skill in the art will immediately recognize that many surfactants are commercially available as blends of related molecules (e.g. IOS and ABS surfactants). Thus, where a co-surfactant is present within a composition provided herein, a person of ordinary skill would understand that the co-surfactant may be a blend of a plurality of related surfactant molecules (as described herein and as generally known in the art). In some embodiments, the co-surfactant is a $C_{10}$-$C_{30}$ internal olefin sulfate (IOS) or a $C_8$-$C_{30}$ alkyl benzene sulfonate (ABS). In other embodiments, the co-surfactant is a combination of a $C_{10}$-$C_{30}$ internal olefin sulfate (IOS) and a $C_8$-$C_{30}$ alkyl benzene sulfonate (ABS). In some embodiments, the $C_{10}$-$C_{30}$ of IOS is a branched unsubstituted $C_{10}$-$C_{30}$ saturated alkyl. In some embodiment, the IOS is a $C_{15}$-$C_{18}$ internal olefin sulfate. In some embodiment, the IOS is a $C_{19}$-$C_{23}$ internal olefin sulfate. In some embodiment, the IOS is a $C_{20}$-$C_{24}$ internal olefin sulfate. In some embodiment, the IOS is a $C_{15}$-$C_{18}$ internal olefin sulfate. In other embodiments, the $C_8$-$C_{30}$ of ABS is a branched unsubstituted $C_8$-$C_{30}$ saturated alkyl.

In some embodiments, the co-surfactant is an unsubstituted alkyl alkoxy sulfate having an alkyl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkyl alkoxy sulfate has the formula $R^A$—$(BO)_e$—$(PO)_f$—$(EO)_g$—$SO_3^-$ or acid or salt (including metal cations such as sodium) thereof, wherein BO is —$CH_2$—CH(ethyl)-O—, PO is —$CH_2$—CH(methyl)-O—, and —$CH_2$—$CH_2$—O—. The symbols e, f and g are integers from 0 to 25 wherein at least one is not zero. In some embodiment, the alkyl alkoxy sulfate is $C_{15}$-13PO-Sulfate (i.e. an unsubstituted $C_{15}$ alkyl attached to 13-$CH_2$—CH(methyl)-O— linkers, in turn attached to —$SO_3^-$ or acid or salt thereof including metal cations such as sodium. In some embodiments, the surfactant is an unsubstituted alkyl sulfate.

Useful co-surfactants are disclosed, for example, in U.S. Pat. Nos. 3,811,504, 3,811,505, 3,811,507, 3,890,239, 4,463,806, 6,022,843, 6,225,267, 7,629,299; WIPO Patent Application WO/2008/079855, WO/2012/027757 and WO/2011/094442; as well as U.S. Patent Application Nos. 2005/0199395, 2006/0185845, 2006/018486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, and 2010/0292110. Additional useful surfactants are surfactants known to be used in enhanced oil recovery methods, including those discussed in D. B. Levitt, A. C. Jackson, L. Britton and G. A. Pope, "Identification and Evaluation of High-Performance EOR Surfactants," SPE 100089, conference contribution for the SPE Symposium on Improved Oil Recovery Annual Meeting, Tulsa, Okla., Apr. 24-26, 2006.

A person having ordinary skill in the art will immediately recognize that many co-surfactants are commercially available as blends of related molecules (e.g. IOS and ABS surfactants). Thus, where a co-surfactant is present within a composition provided herein, a person of ordinary skill would understand that the surfactant may be a blend of a plurality of related co-surfactant molecules (as described herein and as generally known in the art).

In some embodiment, the total surfactant concentration (i.e. the compound of formula (I) or (II) and one or more co-surfactants within the aqueous compositions and emulsion compositions provided herein) is from about 0.05% w/w to about 10% w/w. In other embodiments, the total surfactant concentration in the aqueous composition is from about 0.25% w/w to about 10% w/w. In other embodiments, the total surfactant concentration in the aqueous composition is about 0.5% w/w. In other embodiments, the total surfactant concentration in the aqueous composition is about 1.0% w/w. In other embodiments, the total surfactant concentration in the aqueous composition is about 1.25% w/w. In other embodiments, the total surfactant concentration in the aqueous composition is about 1.5% w/w. In other embodiments, the total surfactant concentration in the aqueous composition is about 1.75% w/w. In other embodiments, the total surfactant concentration in the aqueous composition is about 2.0% w/w. In other embodiments, the total surfactant concentration in the aqueous composition is about 2.5% w/w. In other embodiments, the total surfactant concentration in the aqueous composition is about 3.0% w/w. In other embodiments, the total surfactant concentration in the aqueous composition is about 3.5% w/w. In other embodiments, the total surfactant concentration in the aqueous composition is about 4.0% w/w. In other embodiments, the total surfactant concentration in the aqueous composition is about 4.5% w/w. In other embodiments, the total surfactant concentration in the aqueous composition is about 5.0% w/w. In other embodiments, the total surfactant concentration in the aqueous composition is about 5.5% w/w. In other embodiments, the total surfactant concentration in the aqueous composition is about 6.0% w/w. In other embodiments, the total surfactant concentration in the aqueous composition is about 6.5% w/w. In other embodiments, the total surfactant concentration in the aqueous composition is about 7.0% w/w. In other embodiments, the total surfactant concentration in the aqueous composition is about 7.5% w/w. In other embodiments, the total surfactant concentration in the aqueous composition is about 8.0% w/w. In other embodiments, the total surfactant concentration in the aqueous composition is about 9.0% w/w. In other embodiments, the total surfactant concentration in the aqueous composition is about 10% w/w.

In some embodiments, the concentration of the compound of formula (I) or (II) is about 0.1%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.15%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.20%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.25%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.30%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.35%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.40%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.45%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.50%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.55%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.60%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.65%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.70%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.75%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.80%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.85%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.90%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 0.95%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 1.0%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 1.25%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 1.50%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 1.75%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 2%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 3%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 4%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (I) or (II) is about 5%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the aqueous composition further includes a viscosity enhancing water-soluble polymer. In some embodiments, the water-soluble polymer may be a biopolymer such as xanthan gum or scleroglucan, a synthetic polymer such as polyacryamide, hydrolyzed polyarcrylamide or co-polymers of acrylamide and acrylic acid, 2-acrylamido 2-methyl propane sulfonate or N-vinyl pyrrolidone, a synthetic polymer such as polyethylene oxide, or any other high molecular weight polymer soluble in water or brine. In some embodiments, the polymer is polyacrylamide (PAM), partially hydrolyzed polyacrylamides (HPAM), and copolymers of 2-acrylamido-2-methylpropane sulfonic acid or sodium salt or mixtures thereof, and polyacrylamide (PAM) commonly referred to as AMPS copolymer and mixtures of the copolymers thereof. In one embodiment, the viscosity enhancing water-soluble polymer is polyacrylamide or a co-polymer of polyacrylamide. In one embodiment, the viscosity enhancing water-soluble polymer is a partially (e.g. 20%, 25%, 30%, 35%, 40%, 45%) hydrolyzed anionic polyacrylamide. In some further embodiment, the viscosity enhancing water-soluble polymer has a molecular weight of approximately about $8 \times 10^6$. In some other further embodiment, the viscosity enhancing water-soluble polymer has a molecular weight of approximately about $18 \times 10^6$. Non-limiting examples of commercially available polymers useful for the invention including embodiments provided herein are Florpaam 3330S and Florpaam 3360S. Molecular weights of the polymers may range from about 10,000 daltons to about 20,000,000 daltons. In some embodiments, the viscosity enhancing water-soluble polymer is used in the range of about 500 to about 5000 ppm concentration, such as from about 1000 to 2000 ppm (e.g. in order to match or exceed the reservoir oil viscosity under the reservoir conditions of temperature and pressure).

In some embodiments, the aqueous composition further includes an alkali agent. An alkali agent as provided herein is a basic, ionic salt of an alkali metal (e.g. lithium, sodium, potassium) or alkaline earth metal element (e.g. magnesium, calcium, barium, radium). In some embodiments, the alkali agent is NaOH, KOH, LiOH, $Na_2CO_3$, $NaHCO_3$, Na-metaborate, Na silicate, Na orthosilicate, Na acetate or $NH_4OH$. The aqueous composition may include seawater, or fresh water from an aquifer, river or lake. In some embodiments, the aqueous composition includes hard brine water or soft brine water. In some further embodiments, the water is soft brine water. In some further embodiments, the water is hard brine water. Where the aqueous composition includes soft brine water, the aqueous composition may include an alkaline agent. In soft brine water the alkaline agent provides for enhanced soap generation from the active oils, lower surfactant adsorption to the solid material (e.g. rock) in the reservoir and increased solubility of viscosity enhancing water soluble polymers. The alkali agent is present in the aqueous composition at a concentration from about 0.1% w/w to about 10% w/w. The combined amount of alkali agent and compound provided herein (e.g. compound of formula (I) or (II)) present in the aqueous composition provided herein is approximately equal to or less than about 10% w/w. In some embodiments, the total concentration of alkali agent (i.e. the total amount of alkali agent within the aqueous compositions and emulsion compositions provided herein) in is from about 0.05% w/w to about 5% w/w. In other embodiments, the total alkali agent concentration in the aqueous composition is from about 0.25% w/w to about 5% w/w. In other embodiments, the total alkali agent concentration in the aqueous composition is about 0.5% w/w. In other embodiments, the total alkali agent concentration in the aqueous composition is about 0.75% w/w. In other embodiments, the total alkali agent concentration in the aqueous composition is about 1% w/w. In other embodiments, the total alkali agent concentration in the aqueous composition is about 1.25% w/w. In other embodiments, the total alkali agent concentration in the aqueous composition is about 1.50% w/w. In other embodiments, the total alkali agent concentration in the aqueous composition is about 1.75% w/w. In other embodiments, the total alkali agent concentration in the aqueous composition is about 2% w/w. In other embodiments, the total alkali agent concentration in the aqueous composition is about 2.25% w/w. In other embodiments, the total alkali agent concentration in the aqueous composition is about 2.5% w/w. In other embodiments, the total alkali agent concentration in the aqueous composition is about 2.75% w/w. In other embodiments, the total alkali agent concentration in the aqueous composition is about 3% w/w. In other embodiments, the total alkali agent concentration in the aqueous composition is about 3.25% w/w. In other embodiments, the total alkali agent concentration in the aqueous composition is about 3.5% w/w. In other embodiments, the total alkali agent concentration in the aqueous composition is about 3.75% w/w. In other embodiments, the total alkali agent concentration in the aqueous composition is about 4% w/w. In other embodiments, the total alkali agent concentration in the aqueous composition is about 4.25% w/w. In other embodiments, the total alkali agent concentration in the aqueous composition is about 4.5% w/w. In other embodiments, the total alkali agent concentration in the aqueous composition is about 4.75% w/w. In other embodiments, the total alkali agent concentration in the aqueous composition is about 5.0% w/w.

The aqueous composition may include a surfactant, a co-surfactant and a co-solvent. Thus, in some embodiments, the aqueous composition includes a co-solvent. In some embodiments, the co-solvent is an alcohol, alcohol ethoxylate, glycol ether, glycols, or glycerol. In some embodiments, the co-solvent is TEGBE (triethylene glycol mono butyl ether). In some embodiments, TEGBE is present at a concentration from about 0.01% to about 2%. In some embodiments, TEGBE is present at a concentration from about 0.05% to about 1.5%. In some embodiments, TEGBE is present at a concentration from about 0.2% to about 1.25%. In some embodiments, TEGBE is present at a concentration from about 0.25% to about 1%. In some embodiments, TEGBE is present at a concentration from about 0.5% to about 0.75%. In some embodiments, TEGBE is present at a concentration of about 0.25%. In other embodiments, TEGBE is present at a concentration of about 1%.

In some embodiments, the co-solvent has the formula

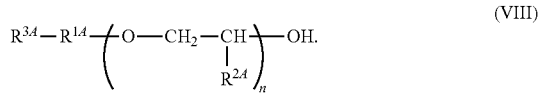

In formula (VIII), $R^{1A}$ is unsubstituted $C_1$-$C_6$ alkylene, unsubstituted phenylene, unsubstituted cyclohexylene, unsubstituted cyclopentylene or methyl-substituted cyclopentylene. $R^{2A}$ is independently hydrogen, methyl or ethyl. $R^{3A}$ is independently hydrogen or

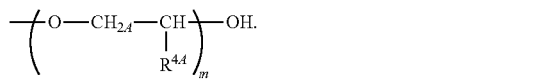

$R^{4A}$ is independently hydrogen, methyl or ethyl, n is an integer from 0 to 30, and m is an integer from 0 to 30. In one embodiment, n is an integer from 0 to 25. In one embodiment, n is an integer from 0 to 20. In one embodiment, n is an integer from 0 to 15. In one embodiment, n is an integer from 0 to 10. In one embodiment, n is an integer from 0 to 5. In one embodiment, n is 1. In other embodiments, n is 3. In one embodiment, n is 5. In one embodiment, m is an integer from 0 to 25. In one embodiment, m is an integer from 0 to 20. In one embodiment, m is an integer from 0 to 15. In one embodiment, m is an integer from 0 to 10. In one embodiment, m is an integer from 0 to 5. In one embodiment, m is 1. In other embodiments, m is 3. In one embodiment, m is 5. In formula (VIII) each of $R^{2A}$ and $R^{4A}$ can appear more than once and can be optionally different. For example, in one embodiment where n is 2, $R^{2A}$ appears twice and can be optionally different. In other embodiments, where m is 3, $R^{4A}$ appears three times and can be optionally different.

$R^{1A}$ may be linear or branched unsubstituted alkylene. In one embodiment, $R^{1A}$ of formula (VIII) is linear unsubstituted $C_1$-$C_6$ alkylene. In one embodiment, $R^{1A}$ of formula (VIII) is branched unsubstituted $C_1$-$C_6$ alkylene. In other embodiments, $R^{1A}$ of formula (VIII) is linear unsubstituted $C_2$-$C_6$ alkylene. In other embodiments, $R^{1A}$ of formula (VIII) is branched unsubstituted $C_2$-$C_6$ alkylene. In other embodiments, $R^{1A}$ of formula (VIII) is linear unsubstituted $C_3$-$C_6$ alkylene. In other embodiments, $R^{1A}$ of formula (VIII) is branched unsubstituted $C_3$-$C_6$ alkylene. In other embodiments, $R^{1A}$ of formula (VIII) is linear unsubstituted $C_4$-$C_6$ alkylene. In other embodiments, $R^{1A}$ of formula (VIII) is branched unsubstituted $C_4$-$C_6$ alkylene. In other embodiments, $R^{1A}$ of formula (VIII) is linear unsubstituted $C_4$-alkylene. In other embodiments, $R^{1A}$ of formula (VIII) is branched unsubstituted $C_4$-alkylene.

In one embodiment, where $R^{1A}$ is linear or branched unsubstituted alkylene (e.g. branched unsubstituted $C_1$-$C_6$ alkylene), the alkylene is a saturated alkylene (e.g. a linear or branched unsubstituted saturated alkylene or branched unsubstituted $C_1$-$C_6$ saturated alkylene). A "saturated alkylene," as used herein, refers to an alkylene consisting only of hydrogen and carbon atoms that are bonded exclusively by single bonds. Thus, in one embodiment, $R^{1A}$ is linear or branched unsubstituted saturated alkylene. In one embodiment, $R^{1A}$ of formula (VIII) is linear unsubstituted saturated $C_1$-$C_6$ alkylene. In one embodiment, $R^{1A}$ of formula (VIII) is branched unsubstituted saturated $C_1$-$C_6$ alkylene. In other embodiments, $R^{1A}$ of formula (VIII) is linear unsubstituted saturated $C_2$-$C_6$ alkylene. In other embodiments, $R^{1A}$ of formula (VIII) is branched unsubstituted saturated $C_2$-$C_6$ alkylene. In other embodiments, $R^{1A}$ of formula (VIII) is linear unsubstituted saturated $C_3$-$C_6$ alkylene. In other embodiments, $R^{1A}$ of formula (VIII) is branched unsubstituted saturated $C_3$-$C_6$ alkylene. In other embodiments, $R^{1A}$ of formula (VIII) is linear unsubstituted saturated $C_4$-$C_6$ alkylene. In other embodiments, $R^{1A}$ of formula (VIII) is branched unsubstituted saturated $C_4$-$C_6$ alkylene. In other embodiments, $R^{1A}$ of formula (VIII) is linear unsubstituted saturated $C_4$-alkylene. In other embodiments, $R^{1A}$ of formula (VIII) is branched unsubstituted saturated $C_4$-alkylene.

In one embodiment, $R^{1A}$ of formula (VIII) is substituted or unsubstituted cycloalkylene or unsubstituted arylene. In one embodiment, $R^{1A}$ of formula (VIII) is $R^{7A}$-substituted or unsubstituted cyclopropylene, wherein $R^{7A}$ is $C_1$-$C_3$ alkyl. In other embodiments, $R^{1A}$ of formula (VIII) is $R^{8A}$-substituted or unsubstituted cyclobutylene, wherein $R^{8A}$ is $C_1$-$C_2$ alkyl. In other embodiments, $R^{1A}$ of formula (VIII) is $R^{9A}$-substituted or unsubstituted cyclopentylene, wherein $R^{9A}$ is $C_1$-alkyl. In other embodiments, $R^{1A}$ of formula (VIII) is $R^{10A}$-substituted or unsubstituted cyclopentylene, wherein $R^{10A}$ is unsubstituted cyclohexyl. In one embodiment, $R^{1A}$ of formula (VIII) is unsubstituted phenylene, unsubstituted cyclohexylene, unsubstituted cyclopentylene or methyl-substituted cyclopentylene.

In one embodiment, —$R^{1A}$—$R^{3A}$ of formula (VIII) is $C_1$-$C_6$ alkyl, unsubstituted phenyl, unsubstituted cyclohexyl, unsubstituted cyclopentyl or a methyl-substituted cycloalkyl.

In one embodiment, the co-solvent has the structure of formula

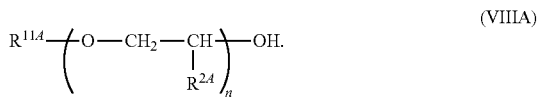

In formula (VIIIA), $R^{11A}$ is $C_1$-$C_6$ alkyl, unsubstituted phenyl, unsubstituted cyclohexyl, unsubstituted cyclopentyl or a methyl-substituted cycloalkyl.

In one embodiment, n and m are independently 1 to 20. In other embodiments, n and m are independently 1 to 15. In other embodiments, n and m are independently 1 to 10. In one embodiment, n and m are independently 1 to 6. In one embodiment, n and m are independently 1.

The co-solvent included in the aqueous compositions provided herein may be a monohydric or a dihydric alkoxy alcohol (e.g. $C_1$-$C_6$ alkoxy alcohol or $C_1$-$C_6$ alkoxy diol). Where the co-solvent is a monohydric alcohol, the co-solvent has the formula (VIII) and $R^{3A}$ is hydrogen.

Where the co-solvent is a diol, the co-solvent has the formula (VIII) and $R^{3A}$ is

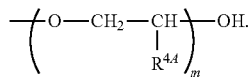

In one embodiment, $R^{1A}$ is linear unsubstituted $C_4$ alkylene and n is 3. In one embodiment, the co-solvent is triethyleneglycol butyl ether. In other embodiments, the co-solvent is tetraethylene glycol. In further embodiments, m is 3. In one embodiment, $R^{1A}$ is linear unsubstituted $C_4$ alkylene and n is 5. In one embodiment, the co-solvent is pentaethyleneglycol n-butyl ether. In further embodiments, m is 5. In one embodiment, $R^{1A}$ is branched unsubstituted $C_4$ alkylene and n is 1. In one embodiment, the co-solvent is ethyleneglycol iso-butyl ether. In further embodiments, m is 1. In one embodiment, $R^{1A}$ is branched unsubstituted $C_4$ alkylene and n is 3. In one embodiment, the co-solvent is triethyleneglycol iso-butyl ether. In further embodiments, m is 3. In one embodiment, the co-solvent is ethylene glycol or propylene glycol. In other embodiments, the co-solvent is ethylene glycol alkoxylate or propylene glycol alkoxylate. In one embodiment, the co-solvent is propylene glycol diethoxylate or propylene glycoltriethoxylate. In one embodiment, the co-solvent is propylene glycol tetraethoxylate.

In the structure of formula (VIII), $R^{3A}$ may be hydrogen or

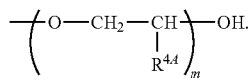

Thus in one embodiment, $R^{3A}$ is

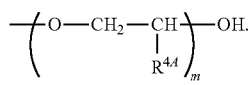

In one embodiment, the co-solvent provided herein may be an alcohol or diol ($C_1$-$C_6$ alcohol or $C_1$-$C_6$ diol). Where the co-solvent is an alcohol, the co-solvent has a structure of formula (I), where $R^{3A}$ is hydrogen and n is 0. Where the co-solvent is a diol, the co-solvent has a structure of formula (VIII), where $R^{3A}$ is

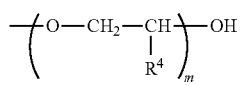

and n and m are 0. Thus, in one embodiment, n and m are independently 0. In one embodiment, $R^{1A}$ is linear or branched unsubstituted $C_1$-$C_6$ alkylene. In other embodiments, $R^{1A}$ is linear or branched unsubstituted $C_2$-$C_6$ alkylene. In one embodiment, $R^{1A}$ is linear or branched unsubstituted $C_2$-$C_6$ alkylene. In one embodiment $R^{1A}$ is linear or branched unsubstituted $C_3$-$C_6$ alkylene. In other embodiments, $R^{1A}$ is linear or branched unsubstituted $C_4$-$C_6$ alkylene. In one embodiment, $R^{1A}$ is linear or branched unsubstituted $C_4$-alkylene. In one embodiment, $R^{1A}$ is branched unsubstituted butylene. In one embodiment, the co-solvent has the structure of formula

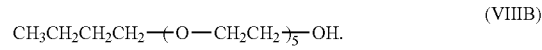

In other embodiments, the co-solvent has the structure of formula

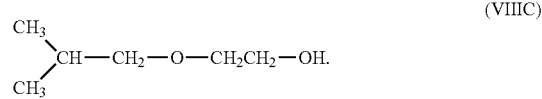

In one embodiment, the co-solvent has the structure of formula

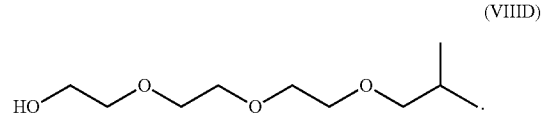

In some embodiments, the co-solvent has the formula

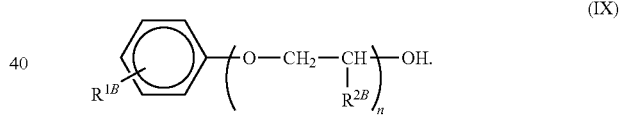

In formula (IX) $R^{1B}$ is independently hydrogen or unsubstituted $C_1$-$C_6$ alkyl, $R^{2B}$ is independently hydrogen or unsubstituted $C_1$-$C_2$ alkyl and n is an integer from 1 to 30. In some embodiments, $R^{1B}$ is unsubstituted $C_2$-$C_6$ alkyl. In some embodiments, $R^{1B}$ is unsubstituted $C_4$-$C_6$ alkyl. In some embodiments, $R^{1B}$ is unsubstituted $C_1$-$C_5$ alkyl. In other embodiments, $R^{1B}$ is unsubstituted $C_1$-$C_4$ alkyl. In other embodiments, $R^{1B}$ is unsubstituted $C_1$-$C_3$ alkyl. In some embodiments, $R^{1B}$ is unsubstituted $C_1$-$C_2$ alkyl. In some embodiments, $R^{1B}$ is unsubstituted $C_2$ alkyl. In other embodiments, $R^{1B}$ is ethyl. In some embodiments, $R^{1B}$ is methyl. In some embodiment, $R^{1B}$ is hydrogen.

$R^{1B}$ may be linear or branched unsubstituted alkyl. In one embodiment, $R^{1B}$ of formula (IX) is linear unsubstituted $C_1$-$C_6$ alkyl. In one embodiment, $R^{1B}$ of formula (IX) is branched unsubstituted $C_1$-$C_6$ alkyl. In other embodiments, $R^{1B}$ of formula (IX) is linear unsubstituted $C_1$-$C_5$ alkyl. In other embodiments, $R^{1B}$ of formula (IX) is branched unsubstituted $C_1$-$C_5$ alkyl. In other embodiments, $R^{1B}$ of formula (IX) is linear unsubstituted $C_1$-$C_4$ alkyl. In other embodiments, $R^{1B}$ of formula (IX) is branched unsubstituted $C_1$-$C_4$ alkyl. In other embodiments, $R^{1B}$ of formula (IX) is linear unsubstituted $C_1$-$C_3$ alkyl. In other embodiments, $R^{1B}$ of formula (IX) is branched unsubstituted $C_1$-$C_3$ alkyl. In other embodiments, $R^{1B}$ of formula (IX) is linear unsubstituted ethyl. In other embodiments, $R^{1B}$ of formula (IX) is branched unsubstituted ethyl.

In one embodiment, where $R^{1B}$ is linear or branched unsubstituted alkyl (e.g. branched unsubstituted $C_1$-$C_6$ alkyl), the alkyl is a saturated alkyl (e.g. a linear or branched unsubstituted saturated alkyl or branched unsubstituted $C_1$-$C_6$ saturated alkyl). A "saturated alkyl," as used herein, refers to an alkyl consisting only of hydrogen and carbon atoms that are bonded exclusively by single bonds. Thus, in one embodiment, $R^{1B}$ is linear or branched unsubstituted saturated alkyl. In one embodiment, $R^{1B}$ of formula (IX) is linear unsubstituted saturated $C_1$-$C_6$ alkyl. In one embodiment, $R^{1B}$ of formula (IX) is branched unsubstituted saturated $C_1$-$C_6$ alkyl. In other embodiments, $R^{1B}$ of formula (IX) is linear unsubstituted saturated $C_1$-$C_5$ alkyl. In other embodiments, $R^{1B}$ of formula (IX) is branched unsubstituted saturated $C_1$-$C_5$ alkyl. In other embodiments, $R^{1B}$ of formula (IX) is linear unsubstituted saturated $C_1$-$C_4$ alkyl. In other embodiments, $R^{1B}$ of formula (IX) is branched unsubstituted saturated $C_1$-$C_4$ alkyl. In other embodiments, $R^{1B}$ of formula (IX) is linear unsubstituted saturated $C_1$-$C_3$ alkyl. In other embodiments, $R^{1B}$ of formula (IX) is branched unsubstituted saturated $C_1$-$C_3$ alkyl. In other embodiments, $R^{1B}$ of formula (IX) is linear unsubstituted saturated ethyl. In other embodiments, $R^{1B}$ of formula (IX) is branched unsubstituted saturated ethyl.

In formula (IX) the symbol n is an integer from 1 to 30. In one embodiment, n is an integer from 1 to 25. In one embodiment, n is an integer from 1 to 20. In one embodiment, n is an integer from 1 to 15. In one embodiment, n is an integer from 1 to 10. In one embodiment, n is an integer from 1 to 5. In some embodiment, n is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In one embodiment, n is 3. In other embodiments, n is 5. In one embodiment, n is 6. In one embodiment, n is 16.

In some embodiments, $R^{1B}$ is hydrogen. In other related embodiments, n is as defined in an embodiment above (e.g. n is at least 1, or at least 15, e.g. 5 to 20). Thus, in some embodiments, $R^{1B}$ is hydrogen and n is 16.

In some embodiments, $R^{1B}$ is methyl. In other related embodiments, n is as defined in an embodiment above (e.g. n is at least 1, or at least 10, e.g. 5 to 20). Thus, in some embodiments, $R^{1B}$ is methyl and n is 16.

In some embodiment, the co-solvent has the formula:

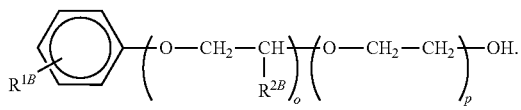

(IXA)

In formula (IXA) $R^{1B}$ is defined as above (e.g. unsubstituted $C_1$-$C_6$ alkyl), $R^{2B}$ is methyl or ethyl, o is an integer from 0 to 10 and p is an integer from 1 to 20. In some embodiments, $R^{2B}$ is methyl. In other embodiments, $R^{2B}$ is ethyl. In formula (IXA) $R^{2B}$ can appear more than once and can be optionally different. For example, in some embodiments where o is 3, $R^{2B}$ appears three times and can be optionally different. In other embodiments, where o is 6, $R^{2B}$ appears 6 times and can be optionally different.

In some embodiments, o is 0 to 10. In some related embodiments, o is 0 to 8. In some related embodiments, o is 0 to 6. In some related embodiments, o is 0 to 4. In some related embodiments, o is 0 to 2. In still further related embodiments, o is 0. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. In some further embodiment, p is 6. In some further embodiment, p is 16. $R^{1B}$ and $R^{2B}$ may be any of the embodiments described above (e.g. $R^{1B}$ maybe linear unsubstituted $C_1$-$C_6$ alkyl, $R^{2B}$ maybe linear unsubstituted $C_1$-$C_2$ alkyl). Thus, in some embodiment, $R^{1B}$ is hydrogen, o is 0 and p is 16.

In some embodiments, o is 1 to 10. In some related embodiments, o is 1 to 8. In some related embodiments, o is 1 to 6. In some related embodiments, o is 1 to 4. In some related embodiments, o is 1 to 2. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ maybe linear unsubstituted $C_1$-$C_6$ alkyl, $R^{2B}$ maybe linear unsubstituted $C_1$-$C_2$ alkyl).

In some embodiments, o is 2 to 10. In some related embodiments, o is 2 to 8. In some related embodiments, o is 2 to 6. In some related embodiments, o is 2 to 4. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ maybe linear unsubstituted $C_1$-$C_6$ alkyl, $R^{2B}$ maybe linear unsubstituted $C_1$-$C_2$ alkyl).

In some embodiments, o is 4 to 10. In some related embodiments, o is 4 to 8. In some related embodiments, o is 4 to 6. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ maybe linear unsubstituted $C_1$-$C_6$ alkyl, $R^{2B}$ maybe linear unsubstituted $C_1$-$C_2$ alkyl).

In some embodiments, o is 6 to 10. In some related embodiments, o is 6 to 8. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ maybe linear unsubstituted $C_1$-$C_6$ alkyl, $R^{2B}$ maybe linear unsubstituted $C_1$-$C_2$ alkyl).

In some embodiments, o is 8 to 10. In some further related embodiment, p is 1 to 20. In some further related embodiment, p is 1 to 18. In some further related embodiment, p is 1 to 16. In some further related embodiment, p is 1 to 14. In some further related embodiment, p is 1 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^{1B}$ and $R^{2B}$ may be any of the embodiments described above (e.g. $R^{1B}$ maybe linear unsubstituted $C_1$-$C_6$ alkyl, $R^{2B}$ maybe linear unsubstituted $C_1$-$C_2$ alkyl).

In formula (IX) or (IXA) $R^{2B}$ may be independently hydrogen or unsubstituted $C_1$-$C_2$ alkyl. In some embodiments, $R^{2B}$ is hydrogen or unsubstituted $C_1$ or $C_2$ alkyl. In some related embodiments, $R^{2B}$ is hydrogen or branched unsubstituted $C_1$ or $C_2$ saturated alkyl. In some embodiments, $R^{2B}$ is hydrogen or a branched unsubstituted $C_1$ saturated alkyl. In some embodiments, $R^{2B}$ is independently hydrogen or methyl. In other embodiments, $R^{2B}$ is independently hydrogen or ethyl. In some embodiments, $R^{2B}$ is independently hydrogen, methyl or ethyl. In some embodiments, $R^{2B}$ is hydrogen. In some embodiments, $R^{2B}$ is methyl. In some embodiments, $R^{2B}$ is ethyl. In formula (IX) $R^{2B}$ can appear more than once and can be optionally different. For example, in some embodiments where n is 3, $R^{2B}$ appears three times and can be optionally different. In other embodiments, where n is 6, $R^{2B}$ appears six times and can be optionally different.

In some embodiments, where multiple $R^{2B}$ substituents are present and at least two $R^{2B}$ substituents are different, $R^{2B}$ substituents with the fewest number of carbons are present to the side of the compound of formula (IX) or (IXA) bound to the —OH group. In this embodiment, the compound of formula (IX) or (IXA) will be increasingly hydrophilic in progressing from the $R^{1B}$ substituent to the side of the compound of formula (IX) or (IXA) bound to the —OH group. The term "side of the compound of formula (IX) or (IXA) bound to the —OH group" refers to the side of the compound indicated by asterisks in the below structures:

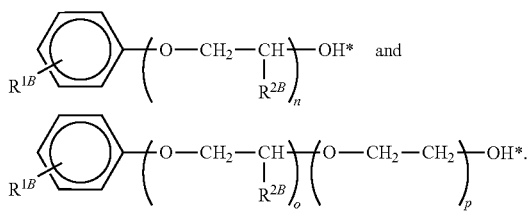

In some embodiments, $R^{2B}$ is hydrogen. In other related embodiments, n is as defined in an embodiment above (e.g. n is at least 1, or at least 20, e.g. 5 to 15). Thus, in some embodiments, $R^{2B}$ is hydrogen and n is 16.

In some embodiments, $R^{2B}$ is methyl. In other related embodiments, n is as defined in an embodiment above (e.g. n is at least 1, or at least 20, e.g. 5 to 15). Thus, in some embodiments, $R^{2B}$ is methyl and n is 16.

As described above the aqueous composition may include the compound of formula (I) or (II), a co-surfactant and a co-solvent. In some embodiments, the compound is TDA-45PO-10EO sulfate (i.e. a compound as described herein for example in formula (II)), wherein $R^1$ is $C_{13}$ alkyl, x is 45 and y is 10), the co-surfactant is $C_{20}$-$C_{24}$ IOS, and the co-solvent is TEGBE. In other embodiments, the compound is C18 Oleyl-45PO-30EO carboxylate (i.e. a compound as described herein for example in formula (II)), wherein $R^1$ is $C_{18}$ unsaturated alkyl, x is 45 and y is 30), the co-surfactant is $C_{19}$-$C_{28}$ IOS, and the co-solvent is phenol-2-ethoxylate (i.e. a compound as described for example in formula (IXA), wherein $R^{1B}$ is hydrogen, o is 0 and p is 2).

In some embodiments, the aqueous composition includes a gas. For instance, the gas may be combined with the aqueous composition to reduce its mobility by decreasing the liquid flow in the pores of the solid material (e.g. rock). In some embodiments, the gas may be supercritical carbon dioxide, nitrogen, natural gas or mixtures of these and other gases.

In some embodiments, the aqueous composition has a pH of less than about 13.0. In other embodiments, the aqueous composition has a pH of less than about 10. In other embodiments, the aqueous composition has a pH of less than about 8. In other embodiments, the aqueous composition has a pH of less than about 12. In other embodiments, the aqueous composition has a pH of less than about 11. In other embodiments, the aqueous composition has a pH of less than about 7.0.

In some embodiments, the aqueous composition has a salinity of at least 5,000 ppm. In other embodiments, the aqueous composition has a salinity of at least 50,000 ppm. In other embodiments, the aqueous composition has a salinity of at least 100,000 ppm. In other embodiments, the aqueous composition has a salinity of at least 250,000 ppm. The total range of salinity (total dissolved solids in the brine) is 100 ppm to saturated brine (about 260,000 ppm). The aqueous composition may include seawater, brine or fresh water from an aquifer, river or lake. The aqueous combination may further include salt to increase the salinity. In some embodiments, the salt is NaCl, KCl, $CaCl_2$, $MgCl_2$, $CaSO_4$, Na acetate or $Na_2CO_3$.

In some embodiments, the temperature of the aqueous composition is at least 20° C. In other embodiments, the temperature of the aqueous composition is at least 800° C. In some embodiments, the aqueous composition has a viscosity of between 20 mPa·s and 100 mPa·s. The viscosity of the aqueous solution may be increased from 0.3 mPa·s to 1, 2, 10, 20, 100 or even 1000 mPa·s by including a water-soluble polymer. As mentioned above, the apparent viscosity of the aqueous composition may be increased with a gas (e.g. a foam forming gas) as an alternative to the water-soluble polymer.

In another aspect, an emulsion composition including an unrefined petroleum and a compound as described herein (e.g. a compound of formula (I) or (II)) is provided. In some embodiments, the emulsion composition includes the components set forth in the aqueous composition provided above. For example, in some embodiments, the emulsion composition further includes a co-surfactant (e.g. wherein the compound and the co-surfactant are present in synergistic surface active amount, a surfactant stabilizing amount, and/or a synergistic solubilizing amount). In some embodiments, the emulsion composition includes a co-surfactant and a co-solvent. The emulsion composition may include a combination of one or more co-surfactants and one or more co-solvents. In other embodiments, the emulsion composition includes a co-surfactant and an alkali agent.

In some embodiments, the emulsion composition is a microemulsion. A "microemulsion" as referred to herein is a thermodynamically stable mixture of oil, water and surfactants that may also include additional components such as co-solvents, electrolytes, alkali and polymers. In contrast, a "macroemulsion" as referred to herein is a thermodynamically unstable mixture of oil and water that may also include additional components. The emulsion composition provided herein may be an oil-in-water emulsion, wherein the surfactant forms aggregates (e.g. micelles) where the hydrophilic part of the surfactant molecule contacts the aqueous phase of the emulsion and the lipophilic part contacts the oil phase of the emulsion. Thus, in some embodiments, the surfactant forms part of the aqueous part of the emulsion. And in other embodiments, the surfactant forms part of the oil phase of the emulsion. In yet another embodiment, the surfactant forms part of an interface between the aqueous phase and the oil phase of the emulsion.

In other embodiments, the oil and water solubilization ratios are insensitive to the combined concentration of divalent metal cations (e.g. $Ca^{+2}$ and $Mg^{+2}$) within the emulsion composition. In other embodiments, the oil and water solubilization ratios are insensitive to the salinity of the water or to all of the specific electrolytes contained in the water. The term "insensitive" used in the context of this paragraph means that the solubilization ratio tends not to change (e.g. tends to remain constant) as the concentration of divalent metal cations and/or salinity of water changes. In some embodiments, the change in the solubilization ratios are less than 5%, 10%, 20%, 30%, 40%, or 50% over a divalent metal cation concentration range of 10 ppm, 100 ppm, 1000 ppm or 10,000 ppm. In another embodiment, the change in the solubilization ratios are less than 5%, 10%, 20%, 30%, 40%, or 50% over a salinity concentration range of 10 ppm, 100 ppm, 1000 ppm or 10,000 ppm.

As described above the aqueous composition may include the compound of formula (I) and (II). In some embodiments, the compound is TDA-45PO-10EO sulfate (i.e. a compound as described herein for example in formula (II)), wherein $R^1$ is linear unsubstituted $C_{13}$ alkyl, $R^2$ is independently hydrogen or methyl, x is 45, y is 10, X is —$SO_3^-Na^+$, the co-surfactant is $C_{20}$-$C_{24}$ IOS and the co-solvent is TEGBE. In some embodiments, the TDA-45PO-10EO sulfate is present from about 0.01% to about 5% w/w. In some further embodiments, the TDA-45PO-10EO sulfate is present at about 0.5% w/w. In other further embodiments, the TDA-45PO-10EO sulfate is present at 0.25% w/w. In other embodiments, the compound is C18 Oleyl-45PO-30EO carboxylate (i.e. a compound as described herein for example in formula (II)), wherein $R^1$ is $C_{18}$ unsaturated alkyl, x is 45 and y is 30, the co-surfactant is $C_{19}$-$C_{28}$ IOS, and the co-solvent is phenol-2-ethoxylate (i.e. a compound as described for example in formula (IXA), wherein $R^1$ is hydrogen, o is 0 and p is 2). In some embodiments, the C18 Oleyl-45PO-30EO carboxylate is present from about 0.01% to about 5% w/w. In some further embodiments, the C18 Oleyl-45PO-30EO carboxylate is present at about 0.4% w/w. In some other further embodiments, the co-surfactant is present at about 0.6% w/w. In another further embodiment, the co-solvent is present at about 0.5% w/w.

III. Methods

In another aspect, a method of displacing a hydrocarbon material in contact with a solid material is provided. The method includes contacting a hydrocarbon material with a compound as described herein (e.g. a compound of formula (I) or (II)), wherein the hydrocarbon material is in contact with a solid material. The hydrocarbon material is allowed to separate from the solid material thereby displacing the hydrocarbon material in contact with the solid material.

In other embodiments, the hydrocarbon material is unrefined petroleum (e.g. in a petroleum reservoir). In some further embodiments, the unrefined petroleum is a light oil. A "light oil" as provided herein is an unrefined petroleum with an API gravity greater than 30. In some embodiments, the API gravity of the unrefined petroleum is greater than 30. In other embodiments, the API gravity of the unrefined petroleum is greater than 40. In some embodiments, the API gravity of the unrefined petroleum is greater than 50. In other embodiments, the API gravity of the unrefined petroleum is greater than 60. In some embodiments, the API gravity of the unrefined petroleum is greater than 70. In other embodiments, the API gravity of the unrefined petroleum is greater than 80. In some embodiments, the API gravity of the unrefined petroleum is greater than 90. In other embodiments, the API gravity of the unrefined petroleum is greater than 100. In some other embodiments, the API gravity of the unrefined petroleum is between 30 and 100. The solid material may be a natural solid material (i.e. a solid found in nature such as rock). The natural solid material may be found in a petroleum reservoir. In some embodiments, the method is an enhanced oil recovery method. Enhanced oil recovery methods are well known in the art. A general treatise on enhanced oil recovery methods is *Basic Concepts in Enhanced Oil Recovery Processes* edited by M. Baviere (published for SCI by Elsevier Applied Science, London and New York, 1991). For example, in an enhanced oil recovery method, the displacing of the unrefined petroleum in contact with the solid material is accomplished by contacting the unrefined with a compound provided herein (e.g. a compound of formula (I) or (II)), wherein the unrefined petroleum is in contact with the solid material. The unrefined petroleum may be in an oil reservoir. The compound provided herein (e.g. a compound of formula (I) or (II)) is pumped into the reservoir in accordance with known enhanced oil recovery parameters. The compound may be pumped into the reservoir as part of the aqueous compositions provided herein and, upon contacting the unrefined petroleum, form an emulsion composition provided herein.

In some embodiments, the natural solid material is rock or regolith. The natural solid material may be a geological formation such as clastics or carbonates. The natural solid material may be either consolidated or unconsolidated material or mixtures thereof. The hydrocarbon material may be trapped or confined by "bedrock" above or below the natural solid material. The hydrocarbon material may be found in fractured bedrock or porous natural solid material. In other embodiments, the regolith is soil. In some embodiments, the compound forms part of an aqueous composition comprising a co-surfactant and the hydrocarbon material is an unrefined petroleum material. In some embodiments, the co-surfactant is an internal olefin sulfonate (IOS), an alfa olefin sulfonate (AOS), an alkyl aryl sulfonate (ARS), an alkane sulfonate, a petroleum sulfonate, an alkyl diphenyl ether (di)sulfonate, an alcohol sulfate, an alkoxy sulfate, an alcohol phosphate, an alkoxy phosphate, a sulfosuccinate ester, an alcohol ethoxylate, an alkyl phenol ethoxylate or a quaternary ammonium salt. In other embodiments, the co-surfactant is a $C_{10}$-$C_{30}$ internal olefin sulfate or a $C_8$-$C_{30}$ alkyl benzene sulfonate. In some embodiments, the aqueous composition further includes a viscosity enhancing polymer.

In some embodiments, an emulsion forms after the contacting. The emulsion thus formed may be the emulsion composition as described above. In some embodiments, the method includes allowing an unrefined petroleum acid within the unrefined petroleum material to enter into the emulsion (e.g. emulsion composition), thereby converting the unrefined petroleum acid into a surfactant. In other words, where the unrefined petroleum acid converts into a surfactant it is mobilized and therefore separates from the solid material.

In another aspect, a method of converting (e.g. mobilizing) an unrefined petroleum acid into a surfactant is provided. The method includes contacting a petroleum material with an aqueous composition thereby forming an emulsion in contact with the petroleum material, wherein the aqueous composition includes the compound described herein (e.g. a compound of formula (I) or (II)) and a co-surfactant. Thus, in some embodiments, the aqueous composition is the aqueous composition described above. And in some embodiments, the emulsion is the emulsion composition described above. An unrefined petroleum acid within the unrefined petroleum material is allowed to enter into the emulsion, thereby converting the unrefined petroleum acid into a surfactant. In some embodiments, the reactive petroleum material is in a petroleum reservoir. In some embodiments, as described above and as is generally known in the art, the unrefined petroleum acid is a naphthenic acid. In some embodiments, as described above and as is generally known in the art, the unrefined petroleum acid is a mixture of naphthenic acid. In some embodiments, the aqueous composition further includes an alkali agent.

In another aspect, a method of making a compound as described herein (e.g. a compound of formula (I) or (II)) is provided. The method includes contacting an alcohol with a propylene oxide thereby forming a first alkoxylated hydrophobe. The first alkoxylated hydrophobe is contacted with an ethylene oxide thereby forming a second alkoxylated hydrophobe. The second alkoxylated hydrophobe is contacted with one or more anionic functional groups thereby forming a compound as described herein. In some embodiments, the contacting is performed at an elevated temperature. An elevated temperature as referred to herein refers to any temperature that is higher than room temperature (e.g. above 25° C., 30° C., 35° C., 40° C., 45° C., 50° C., 55° C., 60° C., 70° C., 80° C., or 90° C.). In the method provided herein, the alcohol has the formula $R^1$—OH (III), wherein $R^1$ is as described herein (e.g. linear unsubstituted $C_8$-$C_{20}$ alkyl). The propylene oxide has the formula

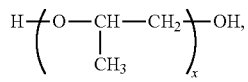

(IV)

wherein x is an integer from 21 to 65. The first alkoxylated hydrophobe has the formula

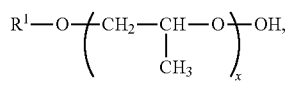

(V)

wherein x is described as above. The ethylene oxide has the formula

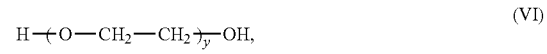

(VI)

wherein y is an integer from 5 to 50. The second alkoxylated hydrophobe has the formula

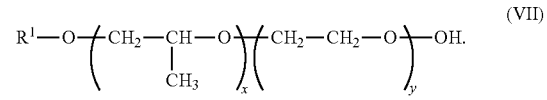

(VII)

IV. Examples

Synthesis of TDA-45PO-10EO sulfate: An alcohol having the formula (III), wherein $R^1$ is $C_{13}$ alkyl is contacted in the presence of base and heat with a propylene oxide having the formula (IV), wherein x is 45, thereby forming a first alkoxylated hydrophobe having the formula (V), wherein x is 45. In the presence of a base and heat, the first alkoxylated hydrophobe is contacted with an ethylene oxide having the formula (VI), wherein y is 10, thereby forming a second alkoxylated hydrophobe having the formula (VII), wherein x is 45 and y is 10, respectively. The second alkoxylated hydrophobe is contacted with sulfamic acid in the presence of heat and neutralization resulting in the synthesis of TDA-45PO-10EO sulfate.

Phase Behavior Procedures

Phase Behavior Screening: Phase behavior studies have been used to characterize chemicals for EOR. There are many benefits in using phase behavior as a screening method. Phase Behavior studies are used to determine, measure or observe characteristics related to chemical performance such as the following examples but are not limited to these examples: (1) the effect of electrolytes; (2) oil solubilization and IFT reduction, (3) microemulsion densities; (4) microemulsion viscosities; (5) coalescence times; (6) optimal surfactant-co-solvent formulations; and/or (7) optimal properties for recovering oil from cores and reservoirs.

Thermodynamically stable phases can form with oil, water and surfactant mixtures. Surfactants form micellar structures at concentrations at or above the critical micelle concentration (CMC). The emulsion coalesces into a separate phase at the oil-water interface and is referred to as a microemulsion. A microemulsion is a surfactant-rich distinct phase consisting of surfactant, oil and water and possibly co-solvents and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (surfactant, alcohol, electrolyte), oil, which is sometimes characterized by its equivalent alkane carbon number (EACN), and surfactant structure, which is sometimes characterized by its hydrophilic-lipophilic balance (HLB). The phase transition was first characterized by Winsor (1954) into three regions: Type I—excess oleic phase, Type III—aqueous, microemulsion and oleic phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio ($\sigma^*$), and the electrolyte concentration where the optimum solubilization ratio occurs is referred to as the Optimal Salinity ($S^*$).

Determining Interfacial Tension

Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the Chun Huh equation, where IFT varies with the inverse square of the solubilization ratio:

$$\gamma = \frac{C}{\sigma^2} \quad (1)$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of surfactants, co-surfactants, co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment

Phase behavior experiments are created with the following materials and equipment.

Mass Balance: Mass balances are used to measure chemicals for mixtures and determine initial saturation values of cores.

Water Deionizer: Deionized (DI) water is prepared for use with all the experimental solutions using a Nanopure™ filter system. This filter uses a recirculation pump and monitors the water resistivity to indicate when the ions have been removed. Water is passed through a 0.45 micron filter to eliminate undesired particles and microorganisms prior to use.

Borosilicate Pipettes: Standard 5 mL borosilicate pipettes with 0.1 mL markings are used to create phase behavior scans as well as run dilution experiments with aqueous solutions. Ends are sealed using a propane and oxygen flame.

Pipette Repeater: An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch: A mixture of propane and oxygen gas is directed through a Bernz-O-Matic flame nozzle to create a hot flame about ½ inch long. This torch is used to flame-seal the glass pipettes used in phase behavior experiments.

Convection Ovens: Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature.

pH Meter: An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations

The oil and water solubilization ratios are calculated from interface measurements taken from phase behavior pipettes. These interfaces are recorded over time as the mixtures approached equilibrium and the volume of any macroemulsions that initially formed decreased or disappeared.

Phase Behavior Methodology

The methods for creating, measuring and recording observations are described in this section. Scans are made using a variety of electrolyte mixtures described below. Oil is added to most aqueous surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of samples. Phase behavior samples are made by first preparing surfactant stock solutions and combining them with brine stock solutions in order to observe the behavior of the mixtures over a range of salinities. All the experiments are created at or above 0.1 wt % active surfactant concentration, which is above the typical CMC of the surfactant.

Solution Preparation. Surfactant stocks are based on active weight-percent surfactant (and co-surfactant when incorporated). The masses of surfactant, co-surfactant, co-solvent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Surfactant Stock. The chemicals being tested are first mixed in a concentrated stock solution that usually consisted of a primary surfactant, co-solvent and/or co-surfactant along with de-ionized water. The quantity of chemical added is calculated based on activity and measured by weight percent of total solution. Initial experiments are at about 1-3% active surfactant so that the volume of the middle microemulsion phase would be large enough for accurate measurements assuming a solubilization ratio of at least 10 at optimum salinity.

Polymer Stock. Often these stocks were quite viscous and made pipetting difficult so they are diluted with de-ionized water accordingly to improve ease of handling. Mixtures with polymer are made only for those surfactant formulations that showed good behavior and merited additional study for possible testing in core floods. Consequently, scans including polymer are limited since they are done only as a final evaluation of compatibility with the surfactant.

Pipetting Procedure. Phase behavior components are added volumetrically into 5 ml pipettes using an Eppendorf Repeater Plus or similar pipetting instrument. Surfactant and brine stocks are mixed with DI water into labeled pipettes and brought to temperature before agitation. Almost all of the phase behavior experiments are initially created with a water oil ratio (WOR) of 1:1, which involves mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition. Consideration must be given to the addition of the components since the concentrations are often several folds greater than the final concentration. Therefore, an order is established to prevent any adverse effects resulting from surfactant or polymer coming into direct contact with the concentrated electrolytes. The desired sample compositions are made by combining the stocks in the following order: (1) Electrolyte stock(s); (2) De-ionized water; (3) Surfactant stock; (4) Polymer stock; and (5) Crude oil or hydrocarbon. Any air bubbles trapped in the bottom of the pipettes are tapped out (prior to the addition of surfactant to avoid bubbles from forming).

Initial Observations. Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing. The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times to provide adequate mixing. Tubes are observed for low tension upon mixing by looking at droplet size and how uniform the mixture appeared. Then the solutions are allowed to equilibrate over time and interface levels are recorded to determine equilibration time and surfactant performance.

Measurements and Observations. Phase behavior experiments are allowed to equilibrate in an oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces. The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

V. References

U.S. Pat. No. 7,629,299: Process for Recovering Residual Oil Employing Alcohol Ether Sulfonates.

U.S. Patent Publication No. 20070191633: Mixed Anionic Surfactant Composition for Oil Recovery.

U.S. Patent Application No. 20100081716: Process for Production of Ether Carboxylates.

U.S. Pat. No. 6,225,267: Sodium Sulfonate Blends as Emulsifiers for Petroleum Oils.

U.S. Patent Application No. 20100048432: Enhanced Oil Recovery using Sulfonate Mixtures.

Anton R E et al. (2008): *Practical Surfactant Mixing Rules Based on the Attainment of Microemulsion-Oil-Water Three-Phase Behavior Systems*. Adv. Polym. Sci. 218:83-113

VI. Tables

TABLE 1

Figure 2:
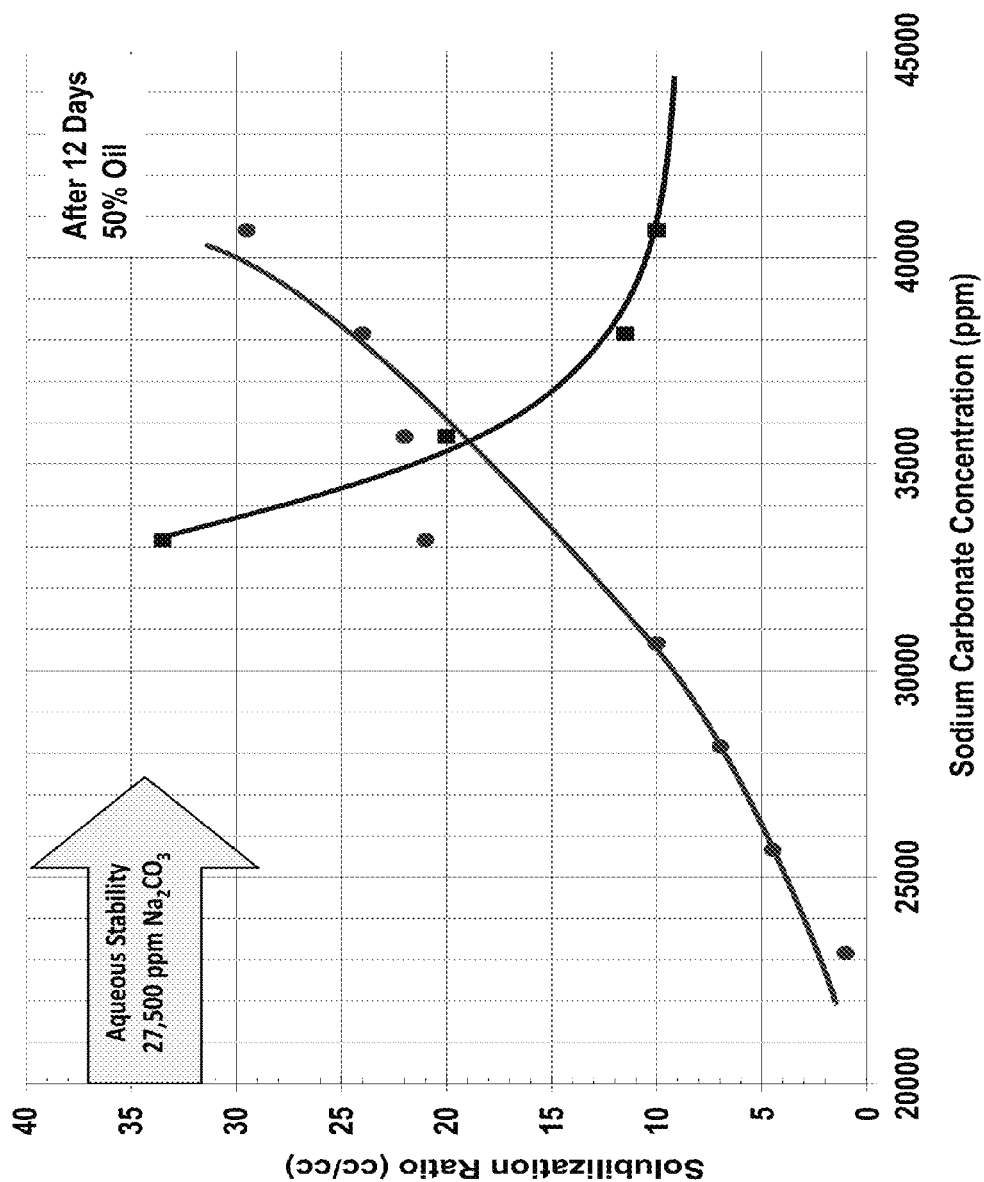
FIG. 2. Solubilization ratios for light crude oil using the surfactant formulation TDA-13PO Sulfate PB with Oil #11 (50%) at 44° C. after 12 days. The surfactant composition includes 0.5% TDA-13PO Sulfate, 0.5% C20-24 IOS, and 1% TEGBE. The black arrow in the histogram pointing from left to right indicates the aqueous stability at 27,500 ppm (TDS) of $Na_2CO_3$.
Figure 3:
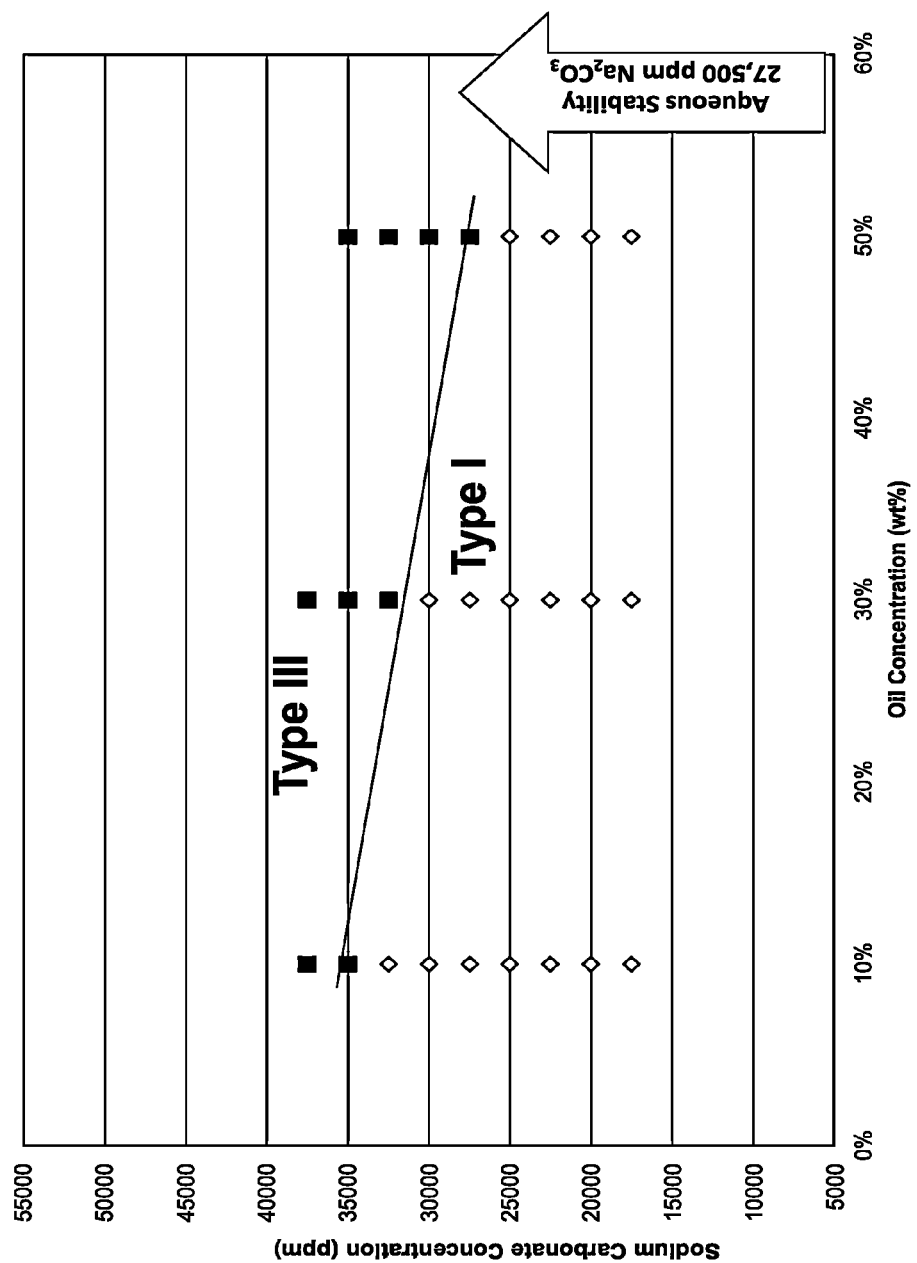
FIG. 3. Activity map for active Oil #11 using formulation TDA-13PO Sulfate with Oil #11 at 44° C. The surfactant composition includes 0.5% TDA-13PO Sulfate, 0.5% C20-24 IOS, and 1% TEGBE. The black arrow in the histogram pointing from left to right indicates the aqueous stability at 27,500 ppm (TDS) of $Na_2CO_3$.
Figure 4:
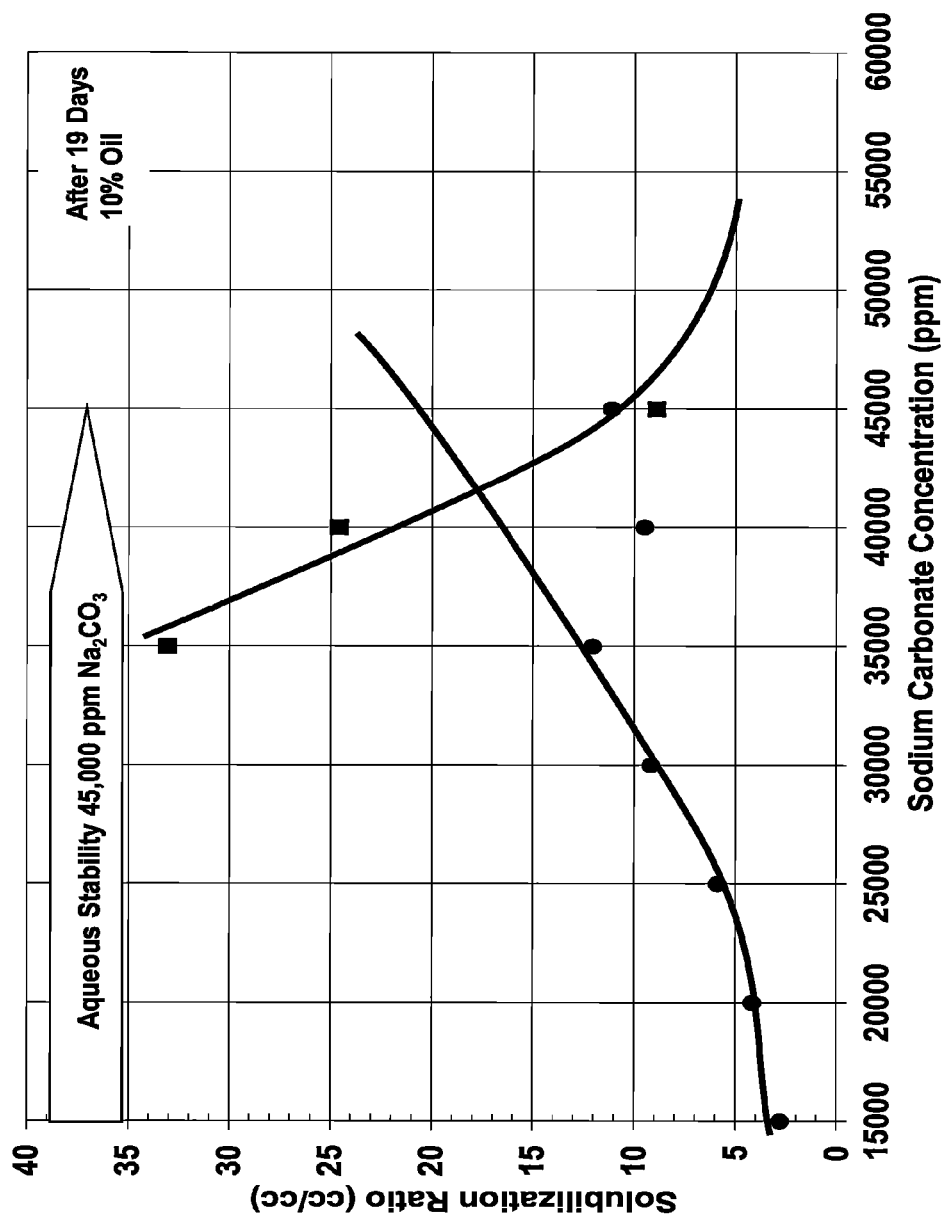
FIG. 4. Solubilization ratios for light crude oil using the surfactant formulation TDA-45PO-10EO Sulfate PB with Oil #11 (10%) at 44° C. after 19 days. The surfactant composition includes 0.5% TDA-45PO-10EO Sulfate, 0.5% C20-24 IOS, and 1% TEGBE. The black arrow in the histogram pointing from left to right indicates the aqueous stability at 45,000 ppm (TDS) of $Na_2CO_3$.
Figure 5:
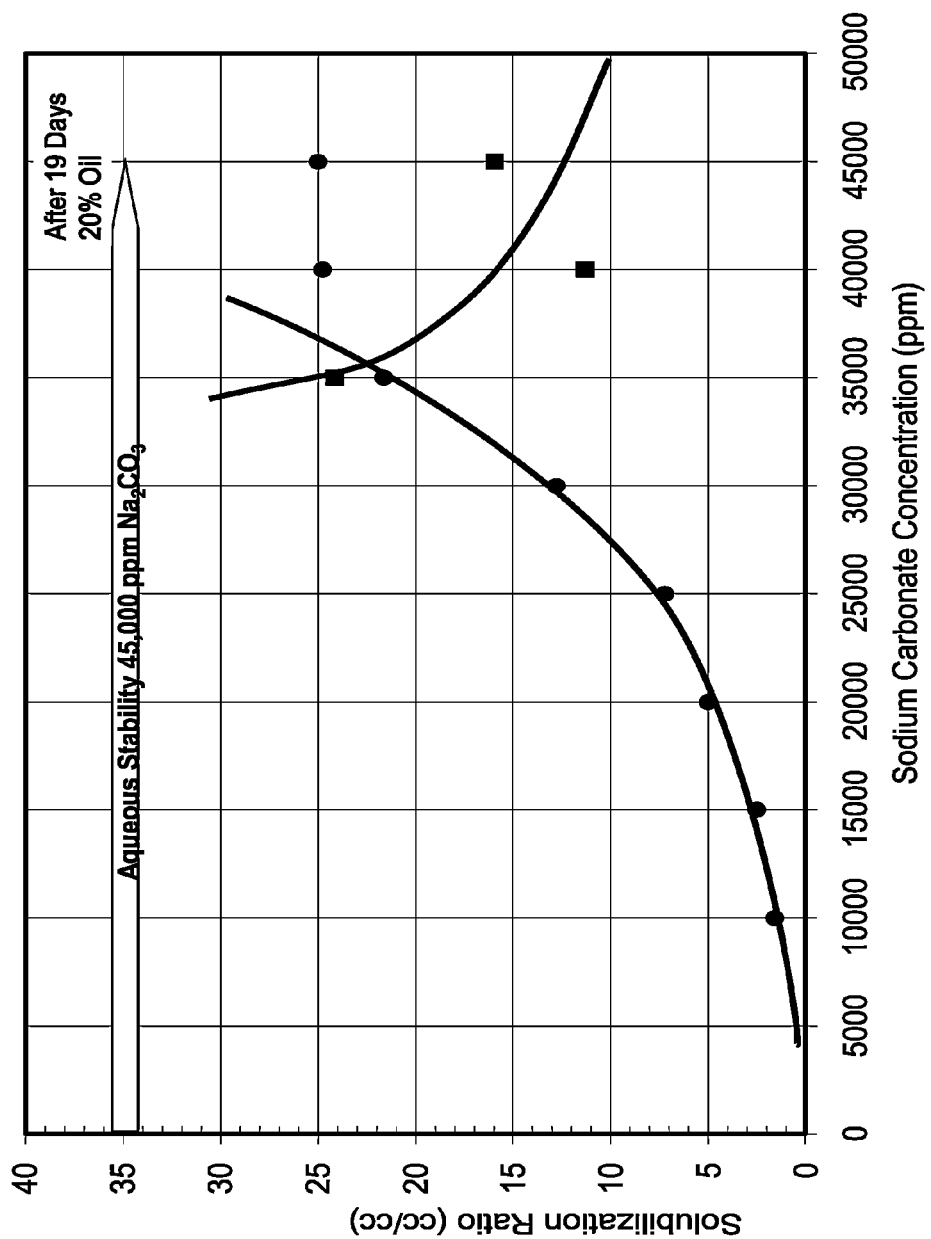
FIG. 5. Solubilization ratios for light crude oil using the surfactant formulation TDA-45PO-10EO Sulfate PB with Oil #11 (20%) at 44° C. after 19 days. The surfactant composition includes 0.5% TDA-45PO-10EO Sulfate, 0.5% C20-24 IOS, and 1% TEGBE. The black arrow in the histogram pointing from left to right indicates the aqueous stability at 45,000 ppm (TDS) of $Na_2CO_3$.
Figure 6:
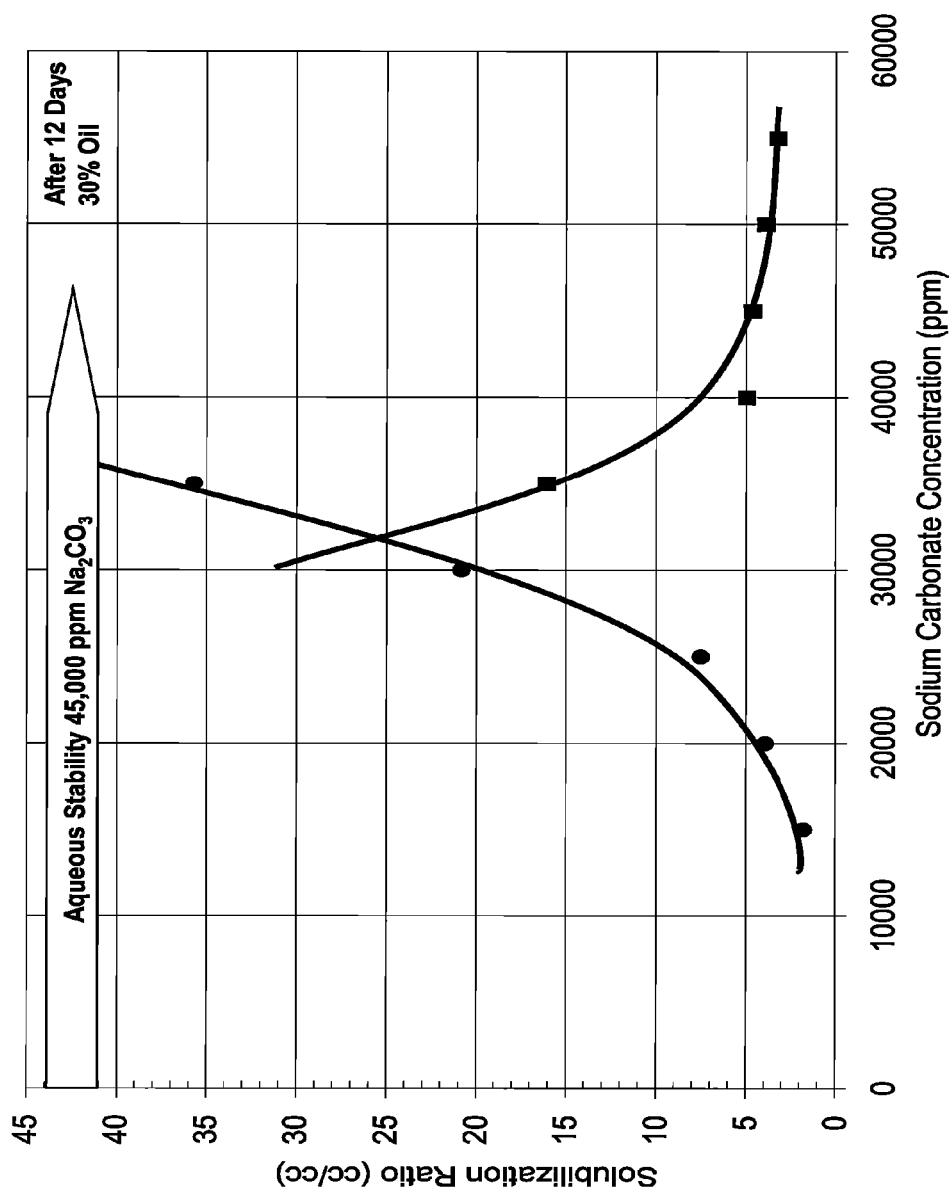
FIG. 6. Solubilization ratios for light crude oil using the surfactant formulation TDA-45PO-10EO Sulfate PB with Oil #11 (30%) at 44° C. after 12 days. The surfactant composition includes 0.5% TDA-45PO-10EO Sulfate, 0.5% C20-24 IOS, and 1% TEGBE. The black arrow in the histogram pointing from left to right indicates the aqueous stability at 45,000 ppm (TDS) of $Na_2CO_3$.
Figure 7:
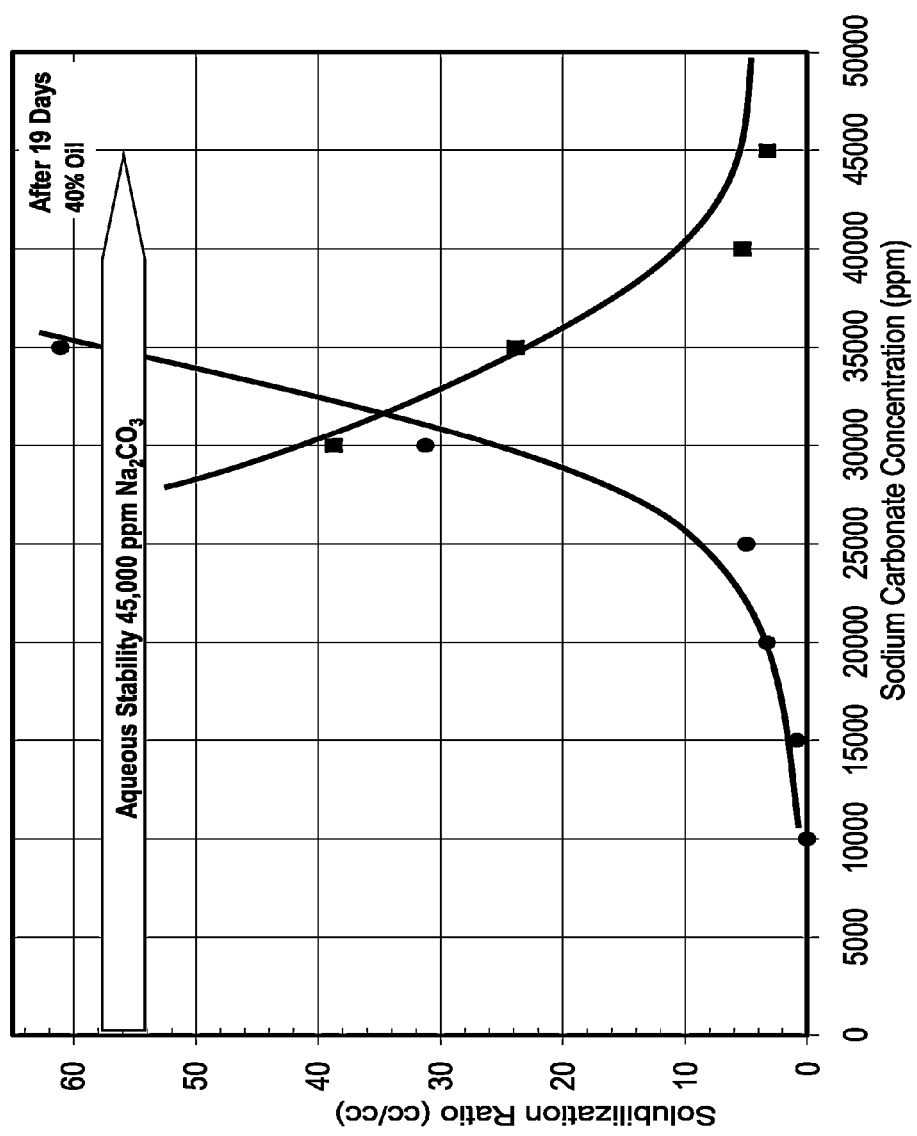
FIG. 7. Solubilization ratios for light crude oil using the surfactant formulation TDA-45PO-10EO Sulfate PB with Oil #11 (40%) at 44° C. after 19 days. The surfactant composition includes 0.5% TDA-45PO-10EO Sulfate, 0.5% C20-24 IOS, and 1% TEGBE. The black arrow in the histogram pointing from left to right indicates the aqueous stability at 45,000 ppm (TDS) of $Na_2CO_3$.
Figure 8:
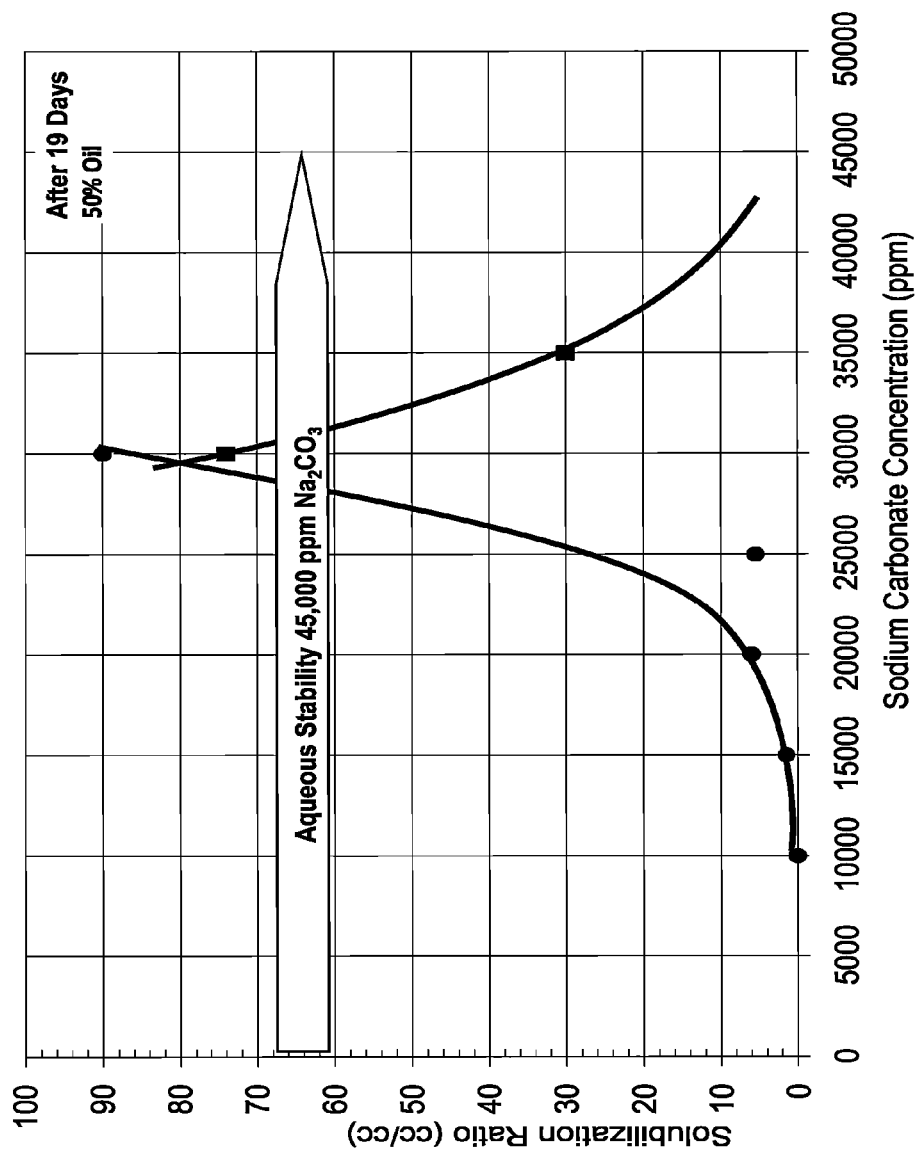
FIG. 8. Solubilization ratios for light crude oil using the surfactant formulation TDA-45PO-10EO Sulfate PB with Oil #11 (50%) at 44° C. after 19 days. The surfactant composition includes 0.5% TDA-45PO-10EO Sulfate, 0.5% C20-24 IOS, and 1% TEGBE. The black arrow in the histogram pointing from left to right indicates the aqueous stability at 45,000 ppm (TDS) of $Na_2CO_3$.
Figure 9:
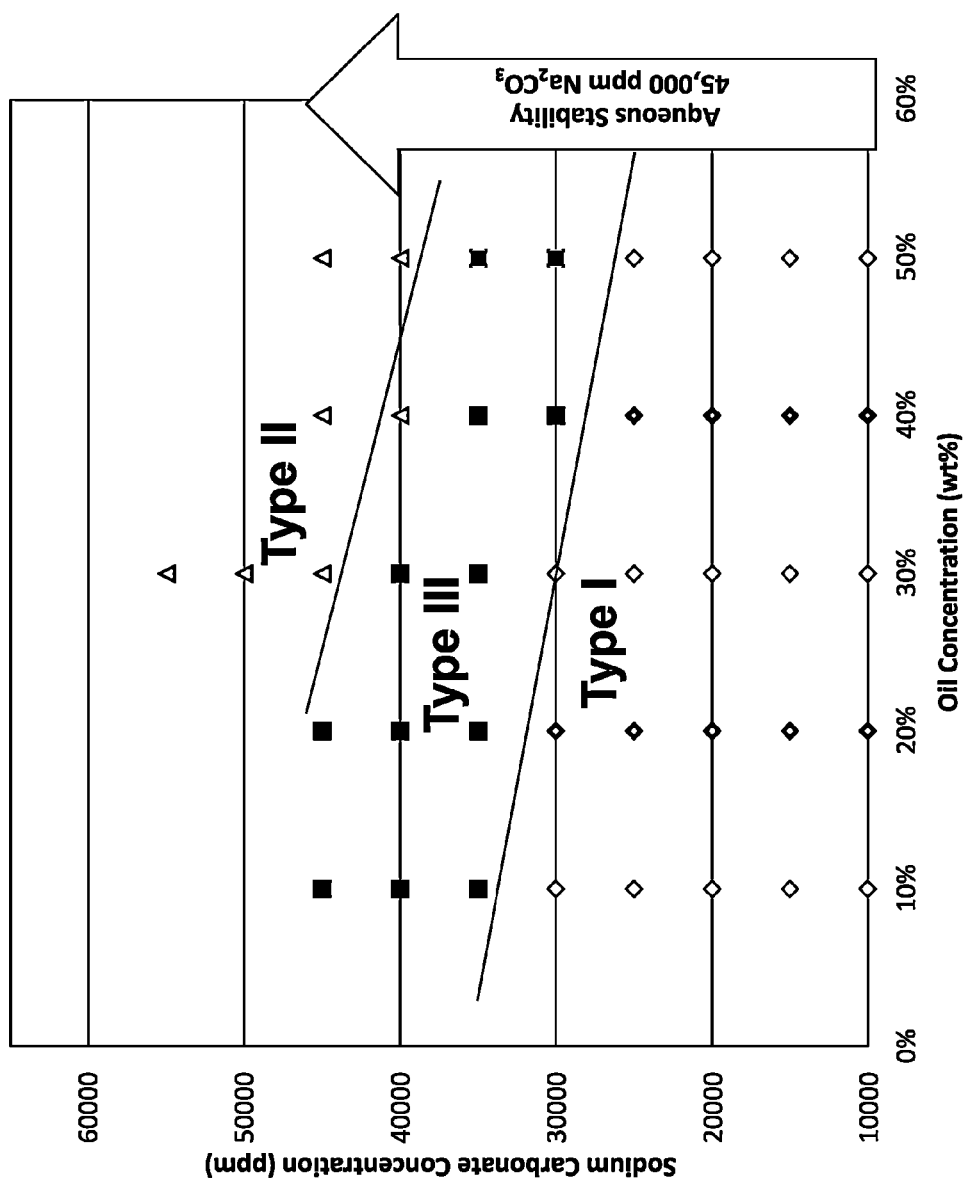
FIG. 9. Activity map for active Oil #11 using formulation TDA-45PO-10EO Sulfate with Oil #11 at 44° C. The surfactant composition includes 0.5% TDA-45PO-10EO Sulfate, 0.5% C20-24 IOS, and 1% TEGBE. The black arrow in the histogram pointing from left to right indicates the aqueous stability at 45,000 ppm (TDS) of $Na_2CO_3$.
Figure 10:
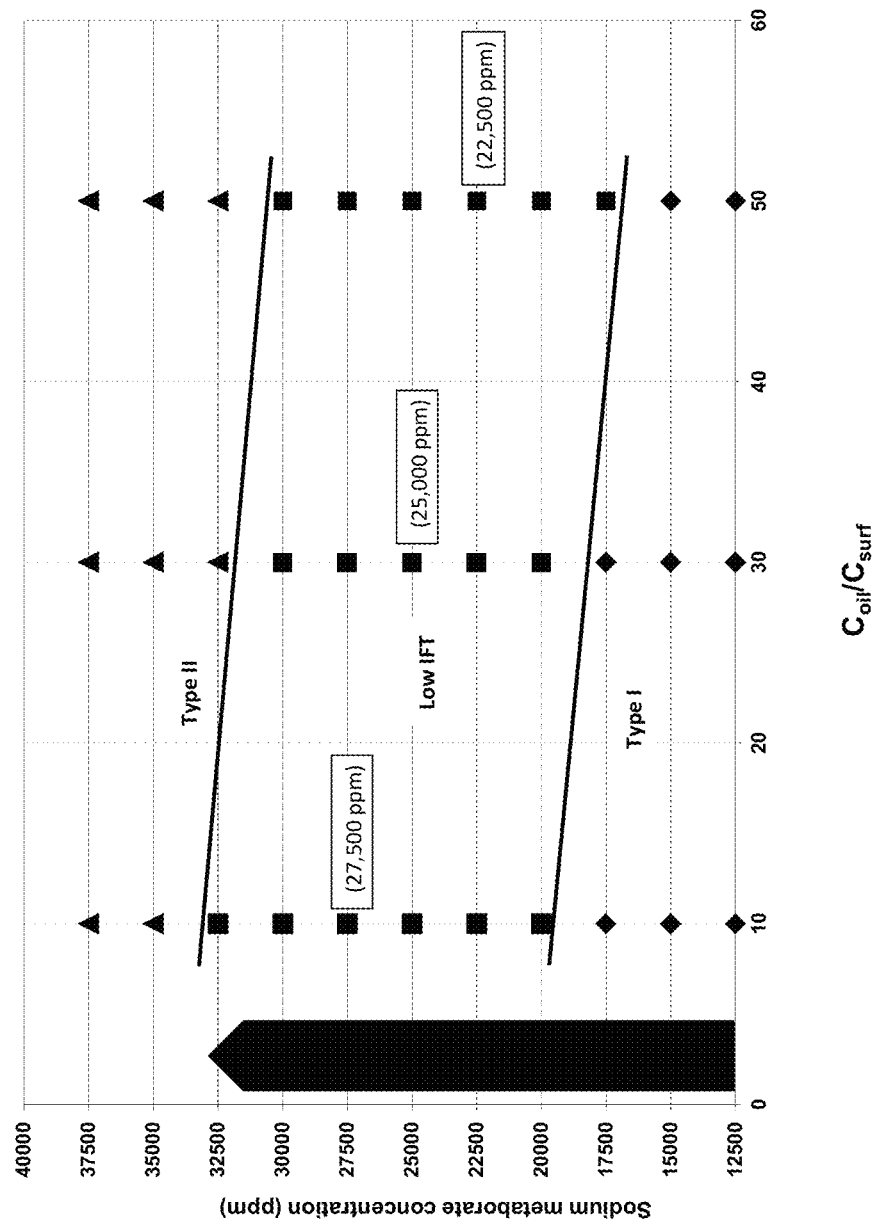
FIG. 10. Activity map for active oil using formulation Ole(C18)-45PO-30EO Carboxylate with oil at 100° C. The surfactant composition includes 0.4% C18 Oleyl-45PO-30EO Carboxylate, 0.6% $C_{19}$-$C_{28}$ IOS, and 0.5% phenol-2EO.
Figure 11:
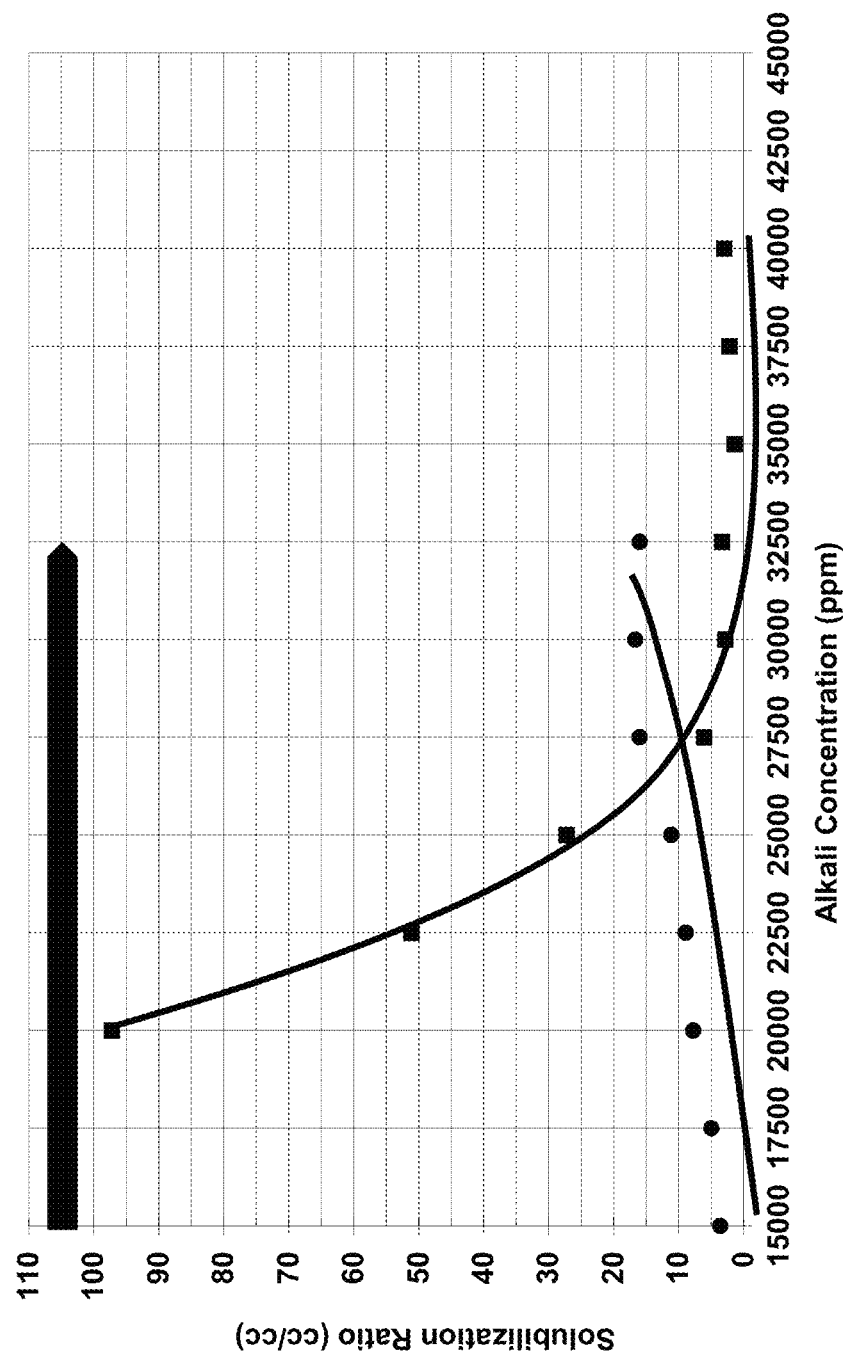
FIG. 11. Solubilization ratios for light crude oil using the surfactant formulation Ole(C18)-45PO-30EO Carboxylate with oil (10%) at 100° C. ° C. after 5 days. The surfactant composition includes 0.4% C18 Oleyl-45PO-30EO Carboxylate, 0.6% $C_{19}$-$C_{28}$ IOS, and 0.5% phenol-2EO. The black arrow in the histogram pointing from left to right indicates the aqueous stability at 32,500 ppm (TDS) of sodium metaborate ($NaBO_2$).
Figure 12:
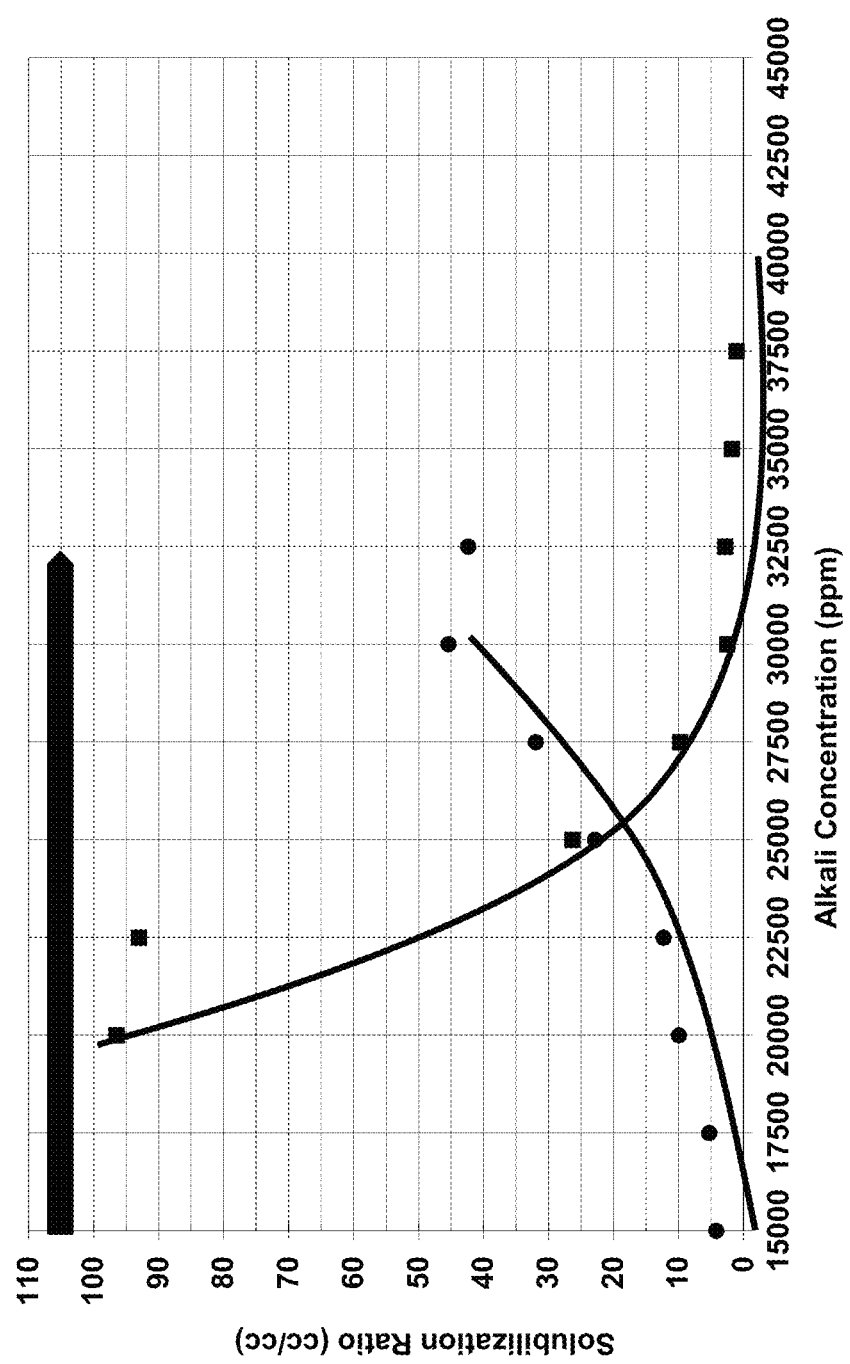
FIG. 12. Solubilization ratios for light crude oil using the surfactant formulation Ole(C18)-45PO-30EO Carboxylate with oil (30%) at 100° C. ° C. after 5 days. The surfactant composition includes 0.4% C18 Oleyl-45PO-30EO Carboxylate, 0.6% $C_{19}$-$C_{28}$ IOS, and 0.5% phenol-2EO. The black arrow in the histogram pointing from left to right indicates the aqueous stability at 32,500 ppm (TDS) of sodium metaborate ($NaBO_2$).
Figure 13:
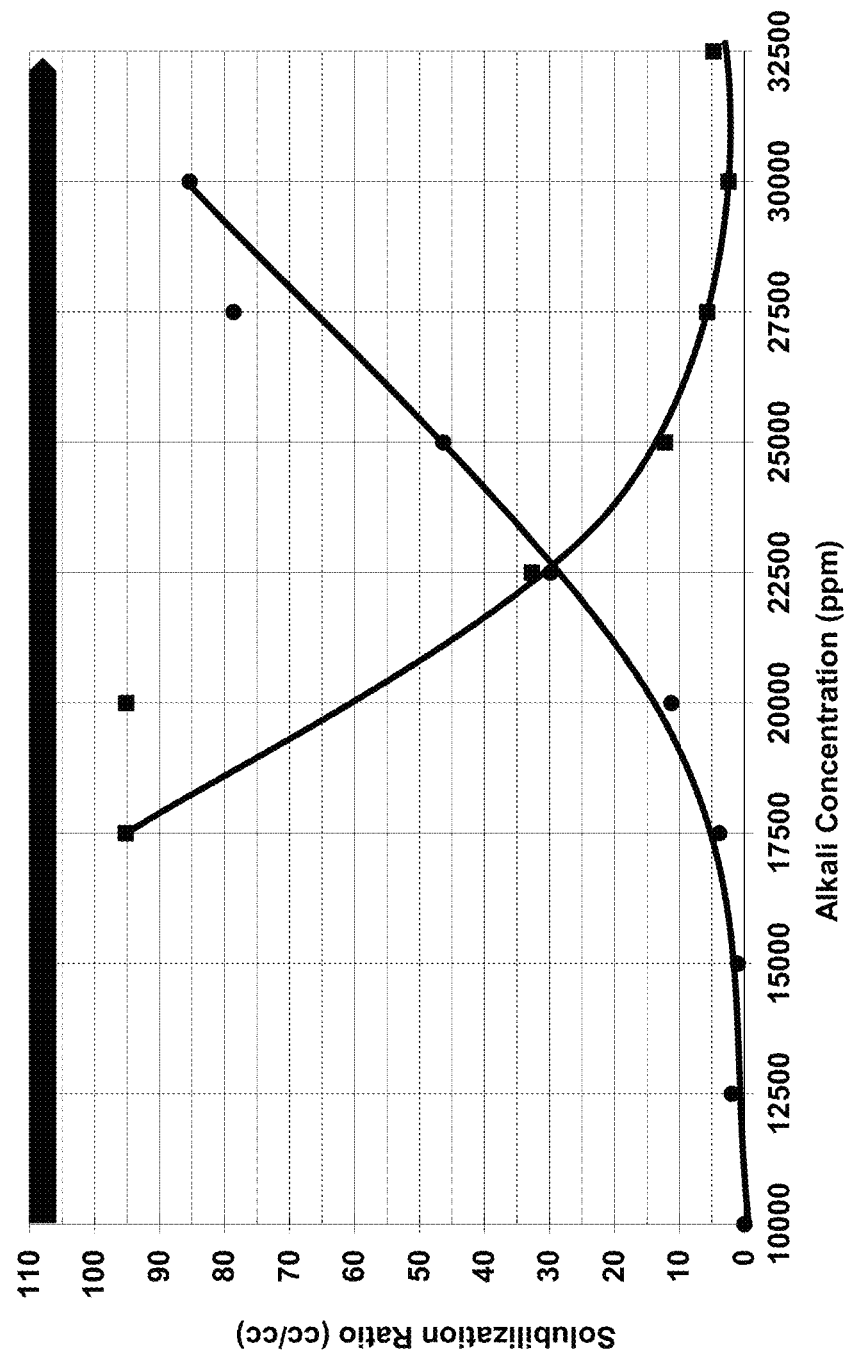
FIG. 13. Solubilization ratios for light crude oil using the surfactant formulation Ole(C18)-45PO-30EO Carboxylate with oil (50%) at 100° C. ° C. after 5 days. The surfactant composition includes 0.4% C18 Oleyl-45PO-30EO Carboxylate, 0.6% $C_{19}$-$C_{28}$ IOS, and 0.5% phenol-2EO. The black arrow in the histogram pointing from left to right indicates the aqueous stability at 32,500 ppm (TDS) of sodium metaborate ($NaBO_2$).

Composition of brine used for examples disclosed in FIG. 1 to FIG. 9.

| Ions | Brine #11 (ppm) |
|---|---|
| $Na^+$ | 1,771 |
| $K^+$ | 269 |
| $Cl^-$ | 1,158 |
| $SO4^{-2}$ | 2,470 |
| TDS | 5,668 |

TABLE 2

Features of Oil #11 used for examples disclosed in FIG. 1 to FIG. 9.

| Crude Oil | °API Gravity | Surrogate Viscosity | Total Acid Number |
|---|---|---|---|
| Oil #11 | 22 | 12.7 cP at 44° C. | Slightly active |

VII. Embodiments

Embodiment 1

A compound having the formula:

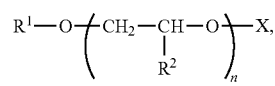

wherein $R^1$ is $R^4$-substituted or unsubstituted $C_8$-$C_{20}$ alkyl, $R^3$-substituted or unsubstituted aryl or $R^3$-substituted or unsubstituted cycloalkyl; $R^2$ is independently hydrogen or methyl; $R^3$ is independently $R^4$-substituted or unsubstituted $C_1$-$C_{15}$ alkyl, $R^4$-substituted or unsubstituted aryl or $R^4$-substituted or unsubstituted cycloalkyl; $R^4$ is independently unsubstituted aryl or unsubstituted cycloalkyl; n is an integer from 25 to 115; X is $-SO_3^-M^+$, $-CH_2C(O)O^-M^+$, $-SO_3H$ or $-CH_2C(O)OH$; and $M^+$ is a monovalent, divalent or trivalent cation.

Embodiment 2

The compound of embodiment 1, wherein $R^1$ is linear or branched unsubstituted $C_8$-$C_{18}$ alkyl or $R^4$-substituted phenyl.

Embodiment 3

The compound of embodiment 1 or 2, wherein $R^1$ is linear or branched unsubstituted $C_{10}$-$C_{18}$ alkyl.

Embodiment 4

The compound of any one of embodiments 1-3, wherein $R^1$ is linear unsubstituted $C_{18}$ unsaturated alkyl.

Embodiment 5

The compound of any one of embodiments 1-3, wherein $R^1$ is linear unsubstituted $C_{12}$-$C_{18}$ alkyl.

Embodiment 6

The compound of any one of embodiments 1-3 or 5, wherein $R^1$ is linear unsubstituted $C_{12}$-$C_{15}$ alkyl.

Embodiment 7

The compound of any one of embodiments 1-3 or 5-6, wherein $R^1$ is linear unsubstituted $C_{13}$ alkyl.

Embodiment 8

The compound of any one of embodiments 1-7, wherein n is 25 to 80.

Embodiment 9

The compound of any one of embodiments 1-8, wherein $M^+$ is $Na^+$, $K^+$, $NH_4^+$, $Ca^{+2}$, $Mg^{+2}$ or $Ba^{+2}$.

Embodiment 10

The compound of any one of embodiments 1-9 having the formula:

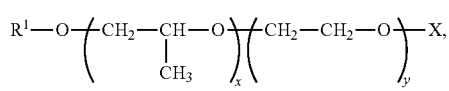

wherein y is an integer from 5 to 35; and x is an integer from 35 to 50.

Embodiment 11

An aqueous composition comprising a co-surfactant and the compound of one of embodiments 1 to 7.

Embodiment 12

The aqueous composition of embodiment 8, wherein said co-surfactant is an anionic surfactant, a non-ionic surfactant, a zwitterionic or a cationic surfactant.

Embodiment 13

The aqueous composition of embodiments 8 or 12, wherein said co-surfactant is an internal olefin sulfonate (IOS), an alfa olefin sulfonate (AOS), an alkyl aryl sulfonate (ARS), an alkane sulfonate, a petroleum sulfonate, an alkyl diphenyl oxide (di)sulfonate, an alcohol sulfate, an alkoxy sulfate, an alkoxy sulfonate, an alcohol phosphate, an alkoxy phosphate, a sulfosuccinate ester, an alcohol ethoxylate, an alkyl phenol ethoxylate, a quaternary ammonium salt, a betaine or sultaine.

Embodiment 14

The aqueous composition of any one of embodiments 8-13, wherein said co-surfactant is a $C_{10}$-$C_{30}$ internal olefin sulfate (IOS) or a $C_8$-$C_{30}$ alkyl benzene sulfonate (ABS).

Embodiment 15

The aqueous composition of any one of embodiments 8-14, further comprising a viscosity enhancing water-soluble polymer.

Embodiment 16

The aqueous composition of any one of embodiments 8-15, further comprising an alkali agent.

Embodiment 17

The aqueous composition of any one of embodiments 8-16, further comprising a co-solvent.

Embodiment 18

The aqueous composition of any one of embodiments 8-17, further comprising a gas.

Embodiment 19

The aqueous composition of any one of embodiments 8-18, wherein said compound is present in an amount sufficient to increase the solubility of said co-surfactant in said aqueous composition relative to the absence of said compound.

Embodiment 20

The aqueous composition of any one of embodiments 8-19, wherein said co-surfactant is present in an amount sufficient to increase the solubility of said compound in said aqueous composition relative to the absence of said co-surfactant.

Embodiment 21

The aqueous composition of any one of embodiments 8-20 having a pH of less than 13.

Embodiment 22

The aqueous composition of any one of embodiments 8-21 having a pH of less than 10.

Embodiment 23

The aqueous composition of any one of embodiments 8-22 having a pH of less than 8.

Embodiment 24

The aqueous composition of any one of embodiments 8-23 having a salinity of at least 5000 ppm.

Embodiment 25

The aqueous composition of any one of embodiments 8-24 having a salinity of at least 100,000 ppm.

Embodiment 26

The aqueous composition of any one of embodiments 8-25 having a salinity of at least 250,000 ppm.

Embodiment 27

The aqueous composition of any one of embodiments 8-26, wherein the temperature of said aqueous composition is at least 20° C.

Embodiment 28

The aqueous composition of any one of embodiments 8-27, wherein the temperature of said aqueous composition is at least 80° C.

Embodiment 29

An emulsion composition comprising an unrefined petroleum and a compound of one of embodiments 1 to 7.

Embodiment 30

The emulsion composition of embodiment 17 further comprising a co-surfactant.

Embodiment 31

The emulsion composition of embodiment 29 or 28, wherein the viscosity of the emulsion composition is less than the viscosity in the absence of the co-surfactant.

Embodiment 32

The emulsion composition of any one of embodiments 17-31, wherein the emulsion composition is a microemulsion.

Embodiment 33

The emulsion composition of any one of embodiments 17-32, wherein the oil and water solubilization ratios of the emulsion composition are insensitive to the combined concentration of $Ca^{+2}$ and $Mg^{+2}$ combined within in the emulsion composition.

Embodiment 34

The emulsion composition of any one of embodiments 17-33, wherein the oil and water solubilization ratios of the emulsion composition are insensitive to the salinity of the water within the emulsion composition.

Embodiment 35

A method of displacing a hydrocarbon material in contact with a solid material, said method comprising:

(i) contacting a hydrocarbon material with the compound of one of embodiments 1 to 7 wherein said hydrocarbon material is in contact with a solid material;

(ii) allowing said hydrocarbon material to separate from said solid material thereby displacing said hydrocarbon material in contact with said solid material.

Embodiment 36

The method of embodiment 20, further comprising contacting the solid material with the compound.

Embodiment 37

The method of embodiments 20 or 36, wherein said hydrocarbon material is unrefined petroleum in a petroleum reservoir and said solid material is a natural solid material in a petroleum reservoir.

Embodiment 38

The method of any one of embodiments 35-37, wherein said method is an enhanced oil recovery method.

Embodiment 39

The method of any one of embodiments 35-38, wherein said natural solid material is rock or regolith.

Embodiment 40

The method of embodiment 39, wherein said regolith is soil.

Embodiment 41

The method of embodiment 20, wherein said compound forms part of an aqueous composition comprising a co-surfactant and said hydrocarbon material is an unrefined petroleum material.

Embodiment 42

The method of any one of embodiments 20-41, wherein an emulsion forms after said contacting.

Embodiment 43

The method of any one of embodiments 42, wherein said method further comprises allowing an unrefined petroleum acid within said unrefined petroleum material to enter into said emulsion, thereby converting said unrefined petroleum acid into a surfactant.

Embodiment 44

The method of any one of embodiments 41-43, wherein said co-surfactant is an internal olefin sulfonate (IOS), an alfa olefin sulfonate (AOS), an alkyl aryl sulfonate (ARS), an alkane sulfonate, a petroleum sulfonate, an alkyl diphenyl ether (di)sulfonate, an alcohol sulfate, an alkoxy sulfate, an alcohol phosphate, an alkoxy phosphate, a sulfosuccinate ester, an alcohol ethoxylate, an alkyl phenol ethoxylate or a quaternary ammonium salt.

Embodiment 45

The method of any one of embodiments 41-44, wherein said co-surfactant is a $C_{10}$-$C_{30}$ internal olefin sulfate or a $C_8$-$C_{30}$ alkyl benzene sulfonate.

Embodiment 46

A method of making a compound of one of embodiments 1 to 7, the method comprising: contacting an alcohol with a propylene oxide thereby forming a first alkoxylated hydrophobe; contacting said first alkoxylated hydrophobe with an ethylene oxide thereby forming a second alkoxylated hydrophobe; and contacting said second alkoxylated hydrophobe with one or more anionic functional groups thereby forming said compound.

Embodiment 47

The method of embodiment 46, wherein said step (i) contacting is performed at an elevated temperature.

What is claimed is:

1. A compound having the formula:

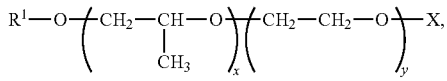

wherein
   $R^1$ is $R^4$-substituted or unsubstituted linear $C_8$-$C_{11}$ alkyl;
   $R^4$ is independently unsubstituted aryl or unsubstituted cycloalkyl;
   y is an integer from 5 to 40;
   x is an integer from 35 to 50;
   X is $-SO_3^-M^+$, $-CH_2C(O)O^-M^+$, $-SO_3H$ or $-CH_2C(O)OH$;
   $M^+$ is a monovalent, divalent or trivalent cation, x is greater than y, and
   the sum of x and y is greater than 50.

2. The compound of claim 1, wherein $M^+$ is $Na^+$, $K^+$, $NH_4^+$, $Ca^{+2}$, $M^{+2}$ or $Ba^{+2}$.

3. An aqueous composition comprising a co-surfactant and the compound of claim 1.

4. The aqueous composition of claim 3, wherein the co-surfactant is an anionic surfactant, a non-ionic surfactant, a zwitterionic surfactant, or a cationic surfactant.

5. The aqueous composition of claim 3, wherein the co-surfactant is a $C_{10}$-$C_{30}$ internal olefin sulfate (IOS) or a $C_8$-$C_{30}$ alkyl benzene sulfonate (ABS).

6. The aqueous composition of claim 3, further comprising a viscosity enhancing water-soluble polymer.

7. The aqueous composition of claim 3, further comprising an alkali agent.

8. The aqueous composition of claim 3, further comprising a co-solvent.

9. The aqueous composition of claim 3, further comprising a gas.

10. The aqueous composition of claim 3, wherein the compound is present in an amount sufficient to increase the solubility of the co-surfactant in the aqueous composition relative to the absence of the compound.

11. The aqueous composition of claim 3 having a salinity of at least 5000 ppm.

12. An emulsion composition comprising an unrefined petroleum and a compound of claim 1.

13. The emulsion composition of claim 12 further comprising a co-surfactant.

14. The emulsion composition of claim 13, wherein the viscosity of the emulsion composition is less than the viscosity in the absence of the co-surfactant.

15. A method of displacing a hydrocarbon material in contact with a solid material, the method comprising:
   (i) contacting a hydrocarbon material with the compound of claim 1, wherein the hydrocarbon material is in contact with a solid material;
   (ii) allowing the hydrocarbon material to separate from the solid material thereby displacing the hydrocarbon material in contact with the solid material.

16. The method of claim 15, wherein the method is an enhanced oil recovery method.

17. The compound of claim 1, wherein y is an integer from 5 to 20.

18. The aqueous composition of claim 3, wherein the aqueous composition does not include a non-ionic surfactant.

19. The emulsion composition of claim 12, wherein the emulsion does not include a non-ionic surfactant.

* * * * *